United States Patent
Chandler

(10) Patent No.: US 10,769,723 B2
(45) Date of Patent: *Sep. 8, 2020

(54) SYSTEMS AND METHODS FOR ELECTRONIC ACCOUNT CERTIFICATION AND ENHANCED CREDIT REPORTING

(71) Applicant: Formfree Holdings Corporation, Johns Creek, GA (US)

(72) Inventor: Brent A. Chandler, Athens, GA (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/639,087

(22) Filed: Jun. 30, 2017

(65) Prior Publication Data
US 2018/0082371 A1 Mar. 22, 2018

Related U.S. Application Data

(63) Continuation of application No. 15/009,316, filed on Jan. 28, 2016, now abandoned, which is a (Continued)

(51) Int. Cl.
*G06Q 40/02* (2012.01)
*G06Q 40/00* (2012.01)
(Continued)

(52) U.S. Cl.
CPC .......... *G06Q 40/025* (2013.01); *G06Q 40/00* (2013.01); *G06Q 40/04* (2013.01); *G06Q 20/10* (2013.01); *G06Q 40/06* (2013.01)

(58) Field of Classification Search
CPC ...... G06Q 40/025; G06Q 40/00; G06Q 40/04; G06Q 20/10; G06Q 40/06
See application file for complete search history.

(56) References Cited

U.S. PATENT DOCUMENTS 6,119,103 A * 9/2000 Basch .................. G06Q 20/341
705/35
6,219,669 B1 * 4/2001 Haff ........................ H04L 29/06
(Continued)

OTHER PUBLICATIONS

Peterson, J. (Feb. 24, 2003). Companies blazing a paper trail to comply with new SEC rules; mandate to certify financial data shakes up longtime business practices at many firms.: [Home Edition]. Los Angeles Times Retrieved from https://dialog.proquest.com/professional/docview/421944680 . . . on Jul. 22, 2020 (Year: 2003).*

(Continued)

*Primary Examiner* — Kito R Robinson
(74) *Attorney, Agent, or Firm* — Lewis Brisbois Bisgaard & Smith LLP; Nigamnarayan Acharya

(57) ABSTRACT

A computer-implemented method includes providing certified financial data indicating financial risk about an individual. The method includes electronically collecting financial account data about the individual from at least one financial source. The method includes transforming the financial account data into a desired format. The method includes validating the financial account data by applying an algorithm engine to the financial account data to identify exceptions, wherein the exceptions indicate incorrect data or financial risk. The method includes marking the exceptions as valid exceptions when output of the algorithm engine validates the exceptions. The method includes confirming the exceptions by collecting additional data and applying the algorithm engine to the additional data.

9 Claims, 24 Drawing Sheets

Related U.S. Application Data continuation of application No. 14/311,724, filed on Jun. 23, 2014, now abandoned, which is a continuation of application No. 13/354,411, filed on Jan. 20, 2012, now Pat. No. 8,762,243, which is a continuation of application No. 12/211,599, filed on Sep. 16, 2008, now abandoned.

(60) Provisional application No. 61/079,761, filed on Jul. 10, 2008, provisional application No. 61/008,997, filed on Dec. 26, 2007.

(51) Int. Cl.
  *G06Q 40/04* (2012.01)
  *G06Q 20/10* (2012.01)
  *G06Q 40/06* (2012.01)

(56) References Cited

U.S. PATENT DOCUMENTS

| | | | | |
|---|---|---|---|---|
| 7,480,631 | B1* | 1/2009 | Merced | G06Q 20/3674 |
| | | | | 235/380 |
| 7,523,135 | B2* | 4/2009 | Bradford | G06Q 10/06 |
| 7,584,146 | B1* | 9/2009 | Duhon | G06Q 20/04 |
| | | | | 705/35 |
| 7,778,915 | B2* | 8/2010 | Angle | G06Q 40/04 |
| | | | | 705/37 |
| 7,945,490 | B2* | 5/2011 | Alonzo | G06Q 40/06 |
| | | | | 705/30 |
| 7,974,922 | B1* | 7/2011 | Hecht, Jr. | G06Q 20/042 |
| | | | | 705/45 |
| 8,255,304 | B1* | 8/2012 | Lorenzo | G06Q 40/00 |
| | | | | 705/35 |
| 8,515,862 | B2* | 8/2013 | Zhang | G06Q 40/025 |
| | | | | 705/38 |
| 8,606,666 | B1* | 12/2013 | Courbage | G06Q 40/04 |
| | | | | 705/34 |
| 2002/0087467 | A1 | 7/2002 | Mascavage, III | G06Q 40/00 |
| | | | | 705/39 |
| 2002/0095360 | A1* | 7/2002 | Joao | G06Q 20/389 |
| | | | | 705/30 |
| 2002/0184133 | A1* | 12/2002 | Zangari | G06Q 40/06 |
| | | | | 705/36 R |
| 2003/0004864 | A1* | 1/2003 | Kregor | G06Q 40/025 |
| | | | | 705/38 |
| 2003/0078896 | A1* | 4/2003 | Fox | G06Q 20/108 |
| | | | | 705/78 |
| 2003/0115122 | A1* | 6/2003 | Slater | G06Q 10/10 |
| | | | | 705/35 |
| 2003/0182244 | A1* | 9/2003 | Zucchetti | G06Q 20/403 |
| | | | | 705/75 |
| 2003/0212615 | A1* | 11/2003 | Whitehead, Jr. | G06Q 20/40 |
| | | | | 705/30 |
| 2004/0111359 | A1* | 6/2004 | Hudock | G06Q 40/02 |
| | | | | 705/38 |
| 2004/0205011 | A1* | 10/2004 | Northington | G06Q 20/102 |
| | | | | 705/35 |
| 2005/0065824 | A1* | 3/2005 | Kohan | G06Q 10/10 |
| | | | | 705/3 |
| 2006/0259420 | A1* | 11/2006 | Schaffer | G06Q 20/10 |
| | | | | 705/39 |
| 2007/0131757 | A1* | 6/2007 | Hamilton | G07F 19/211 |
| | | | | 235/379 |
| 2008/0046368 | A1* | 2/2008 | Tidwell | G06Q 20/40 |
| | | | | 705/44 |
| 2008/0262883 | A1* | 10/2008 | Weiss | G06Q 30/018 |
| | | | | 705/7.42 |
| 2009/0171723 | A1* | 7/2009 | Jenkins | G06Q 40/025 |
| | | | | 705/38 |
| 2009/0254603 | A1* | 10/2009 | Duncan | G06F 21/64 |
| | | | | 709/203 |
| 2010/0299168 | A1* | 11/2010 | Alonzo | G06Q 10/087 |
| | | | | 705/7.29 |
| 2011/0106610 | A1* | 5/2011 | Landis | G06Q 30/0255 |
| | | | | 705/14.39 |
| 2016/0189260 | A1* | 6/2016 | Nagla | G06Q 30/0611 |
| | | | | 705/26.4 |

OTHER PUBLICATIONS

Harney, K. (Jul. 15, 2001). Credit Scores Can Be Improved— Quickly Bureaus Can Correct Report, Leading to Better Loan Terms. Detroit Free Press Retrieved from https://dialog.proquest.com/professional/docview/1271503163?accountid=131444 on Jul. 22, 2020 (Year: 2001).*

Harney, K. (Jul. 15, 2001). 'Rapid rescoring' can make those bad credit files shine series: Credit reporting—first of two parts. (series) : [Final edition]. The Sun Retrieved from https://dialog.proquest.com/professional/docview/406496060?accountid=131444 on Jul. 22, 2020 (Year: 2001).*

* cited by examiner

| Data import | Account information | Certification requests | Exceptions | Certification report | Total financial reporting | | | | System |
|---|---|---|---|---|---|---|---|---|---|
| User Profiles | | | | | | | | | |
| Borrower | Cust # | Name | SSN | Mothers maiden | DOB | State CL | Address | | |
| co-borrower | 454877 | Smith, joe | 000-00-0000 | Mom | 07/22/69 | NY-04564545451 | See detail | | |
| Home seller | 454878 | Smith, jene | 000-00-0000 | Mom | 01/30/73 | NY-08987878752 | See detail | | |
| | 454879 | Willams, Bill | 000-00-0000 | Mom | 06/30/50 | GA-09765454653 | See detail | | |
| Verfication | Borrower | Co-borrower | Home seller | | Action items (click to process) | | | | |
| Identity | Imported | Imported | Incomplete | | Seller identity verfication | | | | |
| Credit Report | Imported | Imported | Incomplete | | Seller credit report | | | | |
| Employment | Imported | Imported | Incomplete | | Seller employment verification | | | | |
| Income | Imported | Imported | Incomplete | | Seller income verfication | | | | |
| Property Information | | Seller | | Borrower | | Loan close date | | | |
| Street address | | 303 green farm way | | 756 W, main street | | 01/30/06 | | | |
| City, state | | Atlanta, GA | | New york, NY | | | | | |
| Zip | | 30342 | | 20021 | | | | | |
| EAC SYS Appraisal | | $ 223,785,00 | | $ 198,765,00 | | | | | |
| Manual Appresial | | $ 278,944,00 | | $ 189,454,00 | | | | | |
| Loan Outstanding | | $ 154,787,00 | | $ 104,567,00 | | | | | |

FIG. 9A

| Data import | Account information | Certification requests | Exceptions | Certification report | | Total financial reporting | System |
|---|---|---|---|---|---|---|---|
| Borrower 912 | User identified | GDD search | | GDD source | | Exception level | Action required |
| Asset | 2 | 5 | | ACH | | High | GDD initialed |
| Debt | 2 | 5 | | Credit report | | High | Send request |
| Income | 4 | 2 | | verrified / government | | High | Send request |
| Co-borrower 914 | User identified | GDD search | | GDD source | | Exception level | Action required |
| Asset | 1 | 3 | | Financial institution | | High | GUD initialed |
| Debt | 4 | 4 | | Credit Report | | None | None |
| Income | 1 | 1 | | Verrified / government | | None | None |
| Home seller 916 | User identified | GDD search | | GDD source | | Exception level | Action required |
| Asset | 1 | 4 | | Financial mgmt software | | High | GDD Initialed |
| Debt | 7 | 10 | | Credit report | | Moderate | Send Request |
| Income | 4 | 2 | | Vender / government | | High | Send Request |

| Data import | Account information | Certification requests | | Exceptions | | Certification report | | Total financial reporting | System |
|---|---|---|---|---|---|---|---|---|---|
| Completeness exceptions (922) | Accounts identified | Accounts recused | | Requests received | | Outstanding requests | | Detail | |
| Borrower | 12 | 0 | | 4 | | 2 | | Waiting for two asset accounts | |
| Co-borrower | 8 | 2 | | 2 | | 0 | | All accounts reporting | |
| Home seller | 16 | 4 | | 4 | | 0 | | All accounts reporting | |
| Real-time asset reporting (924) | Accounts reporting | Cumulative balances | | EAC system last update | | Cumulative transactions | | Exceptions reported | |
| Borrower | 8 | $ 123,343.00 | | 23 seconds | | 345 | | 0 | |
| Co-borrower | 3 | $ 11,789.00 | | 23 seconds | | 99 | | 1 | |
| Home seller | 4 | $ 58,721.00 | | 23 seconds | | 123 | | 0 | |
| Real-time debt reporting (926) | Accounts reporting | Cumulative balances | | EAC system last update | | Credit report last update | | Most current system reporting | |
| Borrower | 10 | $ 239,001.00 | | 23 seconds | | 1 month | | EAC | |
| Co-borrower | 4 | $ 16,732.00 | | 23 seconds | | 2 months | | EAC | |
| Home seller | 10 | $ 189,987.00 | | 23 seconds | | 1 month | | EAC | |

FIG. 9C

| Data import | Account information | Certification requests | Exceptions | Certification report | Total financial reporting | System |
|---|---|---|---|---|---|---|

Data accuracy exceptions — 932

| User | Account | Amount | Exception level | | Details | |
|---|---|---|---|---|---|---|
| Borrower | ABC checking | 30,000.00 | High | | Account doesn't to borrowed | |
| Borrower | ABC savings | 44,271.00 | High | | Account doesn't to borrowed | |

Compliance exceptions — 934

| User | Type | Amount | Date | Payee/Payer | Detail | |
|---|---|---|---|---|---|---|
| Borrower | Prohibited | 30,000.00 | 01/15/06 | Willam bill | Payer name retailed, amount unusual | |
| Home seller | Prohibited | (30,000.00) | 01/14/06 | Smith joe | Payer name retailed, amount unusual | |
| Borrower | Related party | 44,271.00 | 01/10/06 | Granny smith | Payer name retailed, amount unusual | |

Custom user defined exceptions — 936

| User | Type | Amount | Date | Payee/Payer | Details | |
|---|---|---|---|---|---|---|
| Borrower | Possible Kiting | 10,000.00 | 01/28/06 | Smith.Joe | Amount match, owner same | |
| Borrower | Possible Kiting | (10,000.00) | 01/20/06 | Smith.Joe | Amount match, owner same | |
| Borrower | Possible Kiting | 10,000.00 | 01/18/06 | Smith.Joe | Amount match, owner same | |
| Borrower | Possible Kiting | (10,000.00) | 01/17/06 | Smith.Joe | Amount match, owner same | |

| Data import | Account information | Certification requests | Exceptions | Certification report | Total financial reporting | System |
|---|---|---|---|---|---|---|
| | | | | | Time: 8:45 AM | 30-Jan-06 |

EAC detail: smith joe (borrower)

| Asset account | Type | EAC Balance | EAC Last Update | Credit report balance | Credit report last update | Most current Reporting system |
|---|---|---|---|---|---|---|
| Bank of A | Per, checking | $ 68.424.00 | 8.36 AM | Not found | N/A | |
| Bank of A | Small biz chk | 2.542.00 | 8.36 AM | Not found | N/A | |
| Charles schwats | 401(k) | 10.524.00 | 8.36 AM | Not found | N/A | |
| First bank CD | CD | 31.729.00 | 8.44 AM | Not found | N/A | |
| Charles schwab | 401(k) | 10.824.00 | 8.45 AM | Not found | N/A | |
| | | $ 123.343.00 | | | | |

| Debt account | Type | EAC Balance | EAC last update | Credit Report balance | Credit Report Last Update | Most current Reporting system |
|---|---|---|---|---|---|---|
| Bank of A | Mortgage | (104.567.00) | 8.44 AM | (105.743.28) | 12/31/06 | EAC |
| Bank of A | Credit card | (5.587.00) | 8.38 AM | (1.278.83) | 12/31/05 | EAC |
| Autofirst | Auto Loan | (21.678.00) | 8.44 AM | (22.708.23) | 12/31/05 | EAC |
| Gasnorth | Utitliy | (324.98) | 8.45 AM | (127.97) | 12/31/05 | EAC |
| Utitlitynorth | Utility | (165.34) | 8.45 AM | (56.89) | 12/31/05 | EAC |
| | | $ 239.001.00 | | | | |

Identifed exceptions

| Alert ID | Type | Amount | Date | Payer/Payer | Detail |
|---|---|---|---|---|---|
| 789543 | 1 | N/A | N/A | N/A | account does not belong to user |
| 789544 | 1 | N/A | N/A | N/A | account does not belong to user |
| 923434 | Prohibited | 30.000.00 | 01/15/06 | William, bill | Payer name related, amount unusual |
| 923435 | Prohibited | (30.000.00) | 01/14/06 | Smith, joe | Payer name related, amount unusual |
| 923436 | Related party | 44.271.00 | 01/10/06 | Granny smith | Payer name related, amount unusual |
| 923437 | Possible kiting | 10.000.00 | 01/28/06 | Smith joe | Amount match, owner same |
| 923438 | Possible kiting | (10.000.00) | 01/20/06 | Smith joe | Amount match, owner same |
| 923439 | Possible kiting | 10.000.00 | 01/16/06 | Smith joe | Amount match, owner same |
| 923440 | Possible kiting | (10.000.00) | 01/17/06 | Smith joe | Amount match, owner same |

| Data import | Account information | Certification requests | Exceptions | Certification report | Total financial reporting | System |
|---|---|---|---|---|---|---|
| TFR detail: smith, joe (borrower) | | | | Time: 9:00 AM | 31-jan-06 | |
| Financial analysis | | | | 01/31/06 | 01/30/06 | Certification |
| Balance sheet | 8:45 AM | View details | Assets | 109.346.78 | 123.343.00 | Certified |
| Income statement | 8:45 AM | View details | Liabilites | (240.016.78) | 239.001.00 | Certified |
| Case flow | 8:45 AM | View details | Income-to-date | 6.876.90 | - | |
| Rates | 8:45 AM | View details | Expenses-to-date | 20.873.12 | - | |
| Other | 8:45 AM | View details | EAC real-estate | 198.248.00 | 198.765.00 | Certified |
| Financial scorecards | | | | | | |
| R/T net asset score | Credit bureau | 619 | | | | |
| R/T cretit score | EAC | 657 | | | | |
| Historic credit score | Credit Bureau | 589 | | | | |
| Other | | View details | | | | |
| Risk analysis | | | | | | |
| what if scenarios | EAC | View details | | | | |
| Risk scorecard | EAC | View details | | | | |
| Identity scorecard | EAC | View details | | | | |
| Behavior scorecard | EAC | View details | | | | |

| Data import | Account information | Certification requests | Exceptions | Certification report | Total financial reporting | System |
|---|---|---|---|---|---|---|
| | | | | Time: 9:00 AM | ######## (after loan close) | |
| EAC system settings | | | | | | |
| Disputes | | | | | | |
| Pending | | View details | | | | |
| Resolved | | View details | | | | |
| send no | | View details | | | | |
| EAC system settings | | | | | | |
| Government rules | View details | | | | | |
| User rules | View details | | | | | |
| Custom rules | View details | | | | | |
| Other | | | | | | |
| TFR system settings | | | | | | |
| Scorecard logic | View details | | | | | |
| Scoring logic | View details | | | | | |
| Custom logic | View details | | | | | |

FIG. 9G

SYSTEMS AND METHODS FOR ELECTRONIC ACCOUNT CERTIFICATION AND ENHANCED CREDIT REPORTING

PRIORITY

This application claims priority to U.S. patent application Ser. No. 15/009,316, filed on Jan. 28, 2016, entitled "Systems and Methods For Electronic Account Certification and Enhanced Credit Reporting", which claims priority to U.S. patent application Ser. No. 14/311,724, filed on Jun. 23, 2014 entitled "Systems and Methods For Electronic Account Certification and Enhanced Credit Reporting," which claims priority to U.S. patent application Ser. No. 13/354,411, filed on Jan. 20, 2012 entitled "Systems and Methods For Electronic Account Certification and Enhanced Credit Reporting," which claims priority to U.S. patent application Ser. No. 12/211,599 filed on Sep. 16, 2008, entitled "Systems and Methods For Electronic Account Certification and Enhanced Credit Reporting," which claims the benefit of U.S. Provisional Pat. Application No. 61/008,997, filed on Dec. 26, 2007, entitled "Method and system to confirm account balance information with financial institutions electronically" and U.S. Provisional Pat. Application No. 61/079,761, filed on Jul. 10, 2008, entitled "Method and system of verifying assets and enhanced credit reporting." All four applications are incorporated by reference herein in their entirety.

RELATED APPLICATIONS

This application claims priority to U.S. patent application Ser. No. 15/009,316, filed on Jan. 28, 2016, entitled "Systems and Methods For Electronic Account Certification and Enhanced Credit Reporting", which claims priority to U.S. patent application Ser. No. 14/311,724, filed on Jun. 23, 2014 entitled "Systems and Methods For Electronic Account Certification and Enhanced Credit Reporting," which claims priority to U.S. patent application Ser. No. 13/354,411, filed on Jan. 20, 2012 entitled "Systems and Methods For Electronic Account Certification and Enhanced Credit Reporting," which claims priority to U.S. patent application Ser. No. 12/211,599 filed on Sep. 16, 2008, entitled "Systems and Methods For Electronic Account Certification and Enhanced Credit Reporting," which claims the benefit of U.S. Provisional Pat. Application No. 61/008,997, filed on Dec. 26, 2007, entitled "Method and system to confirm account balance information with financial institutions electronically" and U.S. Provisional Pat. Application No. 61/079,761, filed on Jul. 10, 2008, entitled "Method and system of verifying assets and enhanced credit reporting." All four applications are incorporated by reference herein in their entirety.

BACKGROUND

With the increasing costs of credit defaults, financial institutions as a whole have become a highly risk adverse group. Indeed, studies have shown that the likelihood of a credit default or foreclosure is strongly correlated with the amount of financial disclosure and analysis required by a lender. Conventionally, credit lenders have computers running programs for processing credit applicant information and, in response thereto, may approve or decline applications. Computer programs enable faster response to applications. However, the primary data stimulating these credit authorizations is historical debt information reported by credit bureaus. Thus, conventional credit programs poorly manage credit risk by always reacting to non-current and incomplete information.

Given that financial institutions are a risk adverse group, it is not unusual to expect that financial institutions may require a higher rate of return on a loan in order to compensate for the increased credit risk caused by authorizing credit based on historical and incomplete credit report information. A customer with impeccable credit may still receive a higher interest rate from a financial institution, for example, where the financial institution adds "interest rate buffer" to the loan to cover increased credit risk caused by historical and incomplete credit reports. Customers could provide financial institutions access to real-time asset and income data which could be used by financial institutions to more effectively manage credit risk and, for example, provide better credit lending risk management and liquidity. However, in these situations, customers may attempt to manipulate the system. In such a case, rigorous certification rules may need to be applied to financial account data, which may be used to determine completeness, accuracy and compliance of a customer's financial accounts.

These different variables create tremendous complexity for financial institutions, as they must decide what type of loan they wish to make based on all these considerations. They also limit the applicability of online banking networks to provide real-time electronic account certification at different financial institutions, thus requiring continued utilization of historical and incomplete credit reports, further denying them access to real-time electronically certified asset and debt account information, for example.

This disclosure relate generally to credit lending, credit reporting, credit authorization, and financial account analysis and more particularly, to systems and methods for electronically certifying and reporting financial data.

BRIEF DESCRIPTION OF THE DRAWINGS

The foregoing and other aspects of the invention will next be described with reference to the attached drawing figures, in which:

FIGS. 9A-9G provide example user interface screens illustrating one example of electronically communicated information by a system enabling electronic account certification and reporting, according to an embodiment of the invention.

DETAILED DESCRIPTION

In the discussion set forth below, for purposes of explanation, specific details are set forth to provide a thorough understanding of the invention. Systems as disclosed may be practiced without these specific details. In particular, systems described herein can be implemented in devices, systems and software other than examples set forth. In other instances, conventional or otherwise well-known structures, devices, methods and techniques are referred to schematically or shown in block diagram form in order to facilitate description of systems of the invention.

Systems may include steps that may be embodied in machine-executable software instructions, may include method steps implemented as a result of one or more processors executing one or more instructions. In other embodiment, hardware elements may be employed in place of, or in combination with, software instructions to implement the systems.

Overview

Figure 1A:
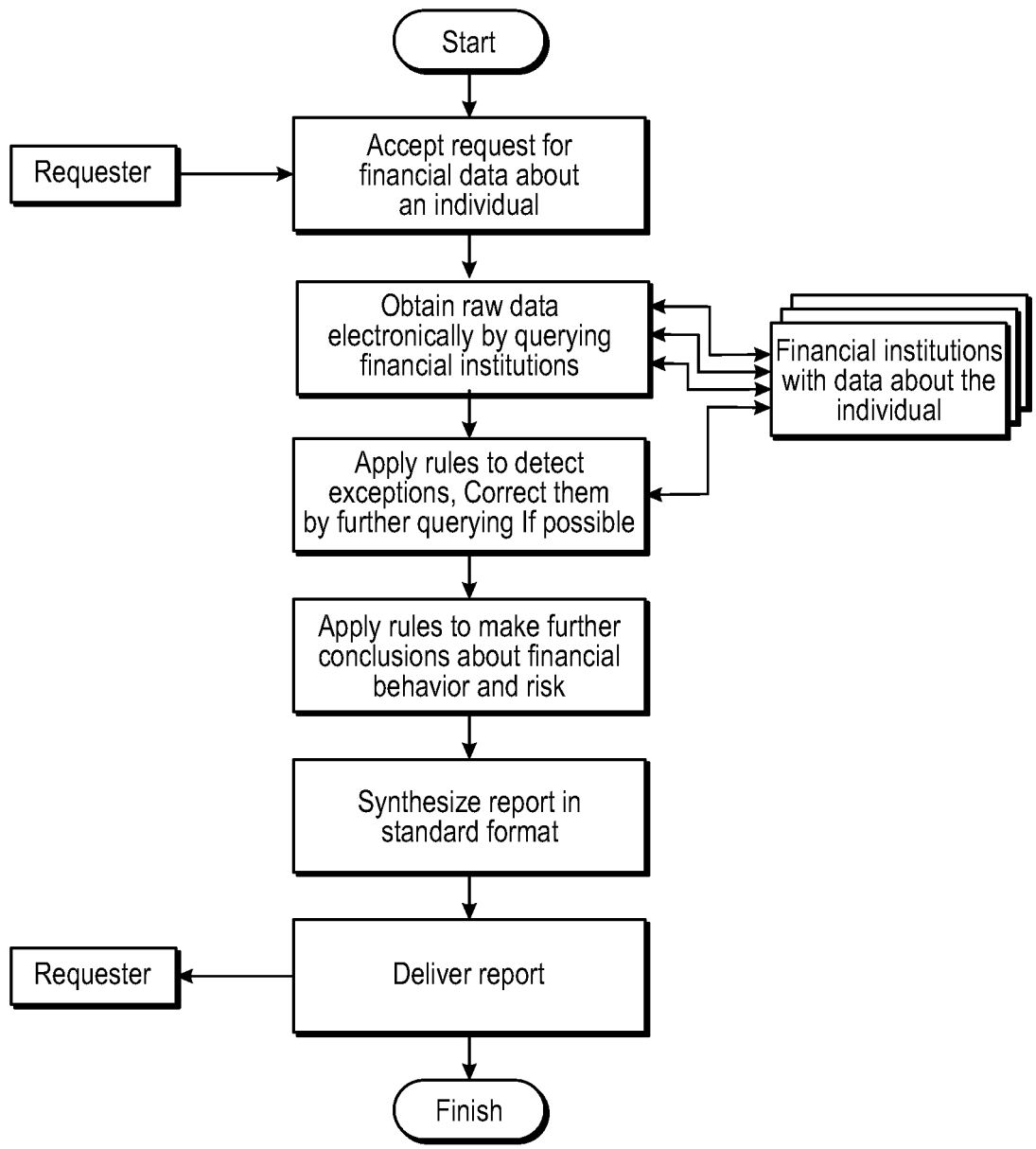
FIG. 1A is a block diagram illustrating one embodiment in which a requester requests information and receives the information.

FIG. 1A is a simplified flow diagram depicting one illustrative embodiment. As shown, the process may begin when a request is received for financial data about an individual, which may be a person (e.g. a customer), business or other entity. Financial sources or institutions are queried electronically for raw data about the individual. The data from the financial sources may have an application-specific data structure. Algorithms or algorithm engines (e.g. a rules or pattern matching rules) are applied to detect exceptions (pieces of data that appear to be erroneous or indicate unusual risk). Such exceptions may be as simple as detecting unusual patterns of direct deposits. Exceptions are discovered by the algorithm, and if possible corrected, by further querying of financial institutions. When exceptions are discovered, further inquiries can be made to financial sources, with permission of the individual, to obtain additional information to support or reject the exception. Algorithms can be applied to the additional information to draw conclusions about financial behavior and risk of the individual. A report can be constructed in the desired format and delivered to the requester. The details of this embodiment are described in detail herein.

One exemplary embodiment includes a computer-implemented method for providing certified financial data indicating financial risk about an individual having the steps of:

(a) receiving a request for the certified financial data;
(b) electronically collecting financial account data about the individual from at least one financial source;
(c) transforming the financial account data into a desired format;
(d) validating the financial account data by applying an algorithm engine to the financial account data to identify exceptions, wherein the exceptions indicate incorrect data or financial risk;
(e) confirming the exceptions by collecting additional data and applying the algorithm engine to the additional data,
(f) marking the exceptions as valid exceptions when output of the algorithm engine validates the exceptions; and
(g) generating a report from the financial data and the valid exceptions.

In this example, financial account data can include at least one of real-time transaction data, Real time balance data, historical transaction data, or historical balance data; and the algorithm engine identifies a pattern of financial risk or financially risky behavior. The pattern of risk can be selected from the group consisting of not-sufficient funds instances, direct deposit irregularities, deposit transactions, transaction velocity, purchase history, overdraft patterns, and combinations thereof. The individual may be business, organization, partnership, or other entity.

In a specific embodiment, the algorithm engine can be programmed with knowledge of patterns of risk of financial risk. The algorithm engine can also programmed to know additional information regarding proprietary strategies to detect exceptions, including but not limited to, for example, strategies to detect not-sufficient funds instances, direct deposit irregularities, deposit transactions, transaction velocity, purchase history, overdraft patterns. Using knowledge of financial risk or risky behaviors that have been programmed, the algorithm engine can identify exceptions.

Figure 1B:
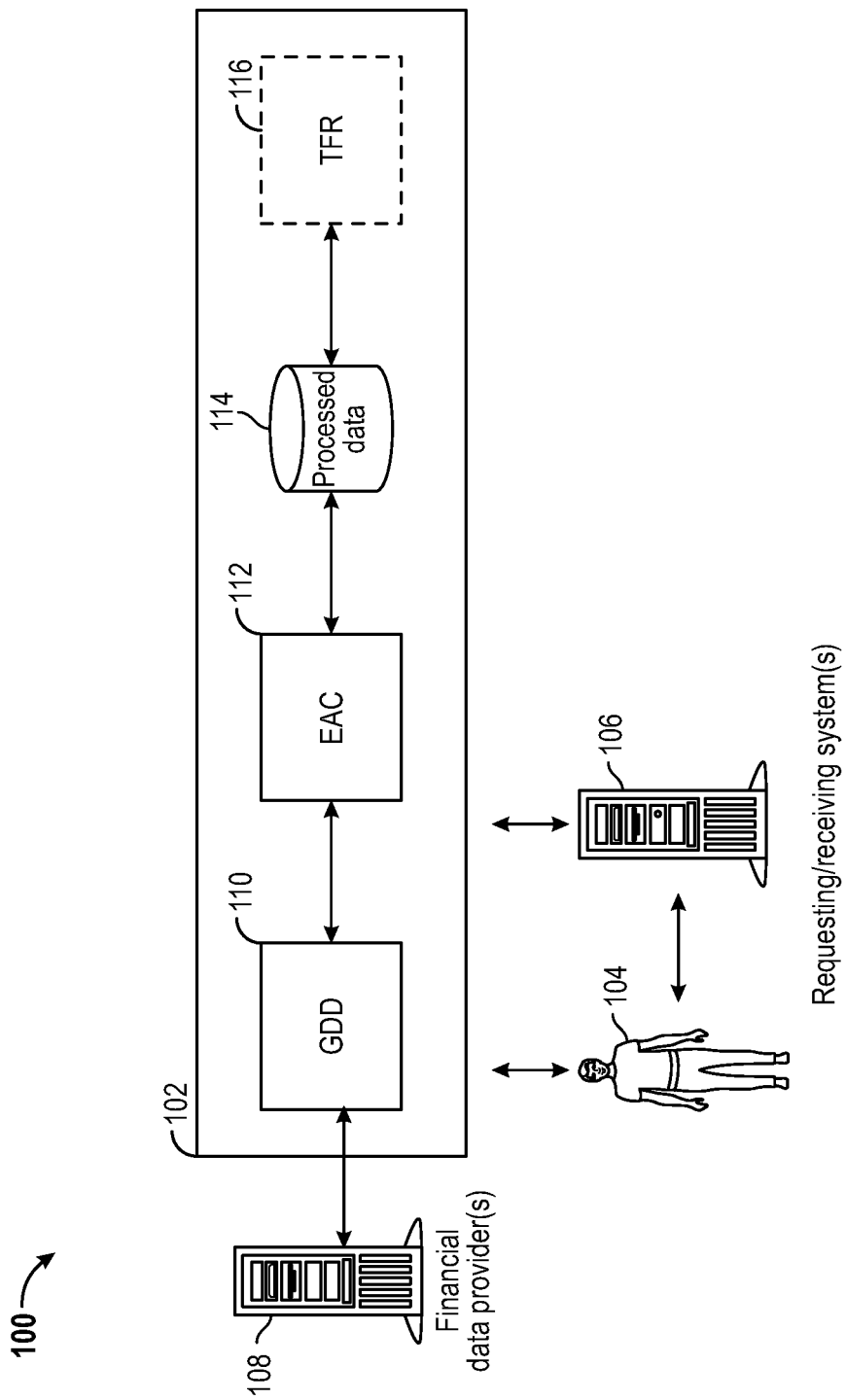
FIG. 1B is a block diagram illustrating one example of real-time electronic account certification with total financial reporting and global data download.

Referring now to FIG. 1B, there is shown one example system of electronic account certification 100. The certification system 102 may feature one of more subsystems, such as electronic account certification subsystems 112 ("EAC") coupled with total financial reporting subsystems 116 ("TFR") and global data download subsystems 110 ("GDD"). Ultimately, a credit lender may want a customer's assets, liabilities, income, and expenses electronically analyzed and certified in real-time so that financial worthiness can be "determined" before responding to credit or loan applications that may be submitted to underwriters and secondary markets or to other various national, state and local government and regulatory bodies throughout the world. Additionally, a credit seeker may want asset and liability accounts electronically analyzed and certified in real-time so that financial worthiness can be "proved" and submitted to electronic ("EAC") systems that may electronically provide credit seekers access to credit leaders. In one example embodiment, credit seekers which provide ("EAC") systems total real-time access to financial data may receive lower interest rates and/or better credit terms from credit lender.

("EAC") enables this by synthesizing financial data about consumers from one or more sources: 1) system users 104; 2) import sources from requesting and receiving systems 106; and 3) information already stored 114, whatever the original source. Additionally, through ("GDD") 110, data may be imported over communications networks electronically seamlessly from a variety of financial data providers 108 such as banks, credit reporting agencies, brokerages, mortgage lenders, governments and the like, and from financial management software. Electronically obtained information may be electronically processed by ("EAC") 112 and electronically output as processed data 114. Processed data 114 may be electronically used by ("TFR") 116 to generate a plurality of real-time risk and financial reports which may be used to provide real-time account certification and more complete and current information to credit reporting systems.

System Architecture

Computerized systems and software exist in a variety of forms, and systems of the invention may be implemented in such variety. Systems may run on enterprise mainframe environments, servers, and individuals' desktop computers. Systems may be accessed via the World Wide Web or any type of communications network. In this context, users may visit a web site and request electronic account certification and total financial reporting. Example embodiments may provide means in which systems of the invention may charge a fee to system users based on any customized pricing strategy, such as charging fees for financial transparency or fees as a percentage of credit interest rate discount, for example. Additionally, systems of the invention can be implemented in wireless communication devices, swipe cards, key pads, digital tags, mobile wallets or any other type of device having ability to communicate with any type of financial system.

Further, particular examples discussed herein may relate to electronic account certifications and total financial reporting systems involving financial accounts as financial institutions. However, systems and methods described herein may be applied to any type of system. For example, income and employment verification systems may access systems of the invention to provide enhanced information not currently available from income and employment verification services. Similarly, credit reporting and credit authorization systems may access systems of the invention to provide merchants and other users of conventional credit reports enhanced products and services designed to increase financial transparency of customers. Moreover, personal financial management software and sites may integrate systems of the invention to provide electronic account certification. Thus, systems and methods described herein may be applied to several different systems instead of systems discussed in examples provided herein.

Figure 2:
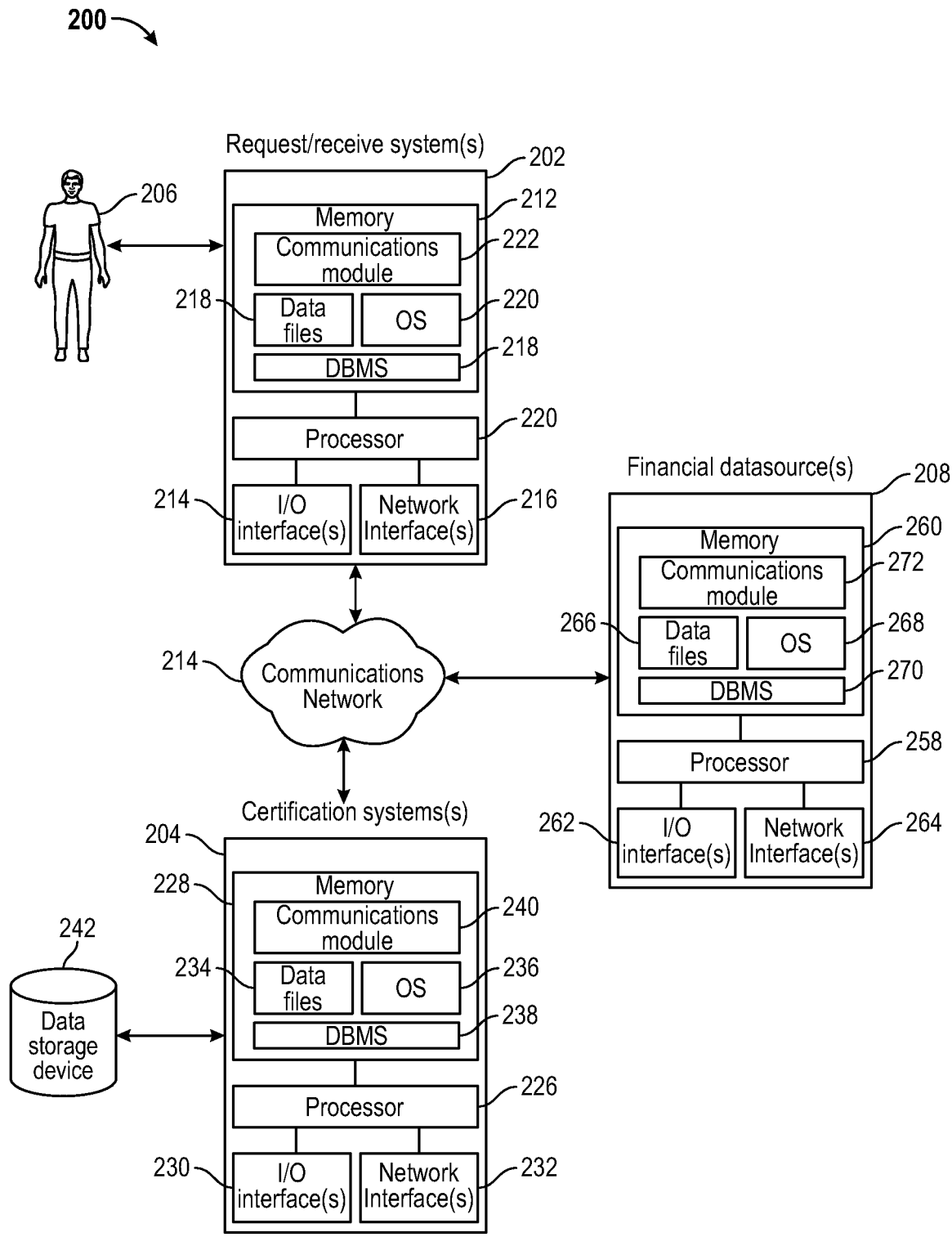
FIG. 2 illustrates one example of interactions between various devices, computing systems, and user entities in network environments.

FIG. 2 illustrates a system 200 that allows a system to request and receive certification and reporting of financial account data or to electronic match credit interests of credit seekers and credit lenders as a function of the certification reporting. In particular, the system 200 may include at least one requesting/receiving system 202, at least one certification system 204, and at least one financial data provider 208, which are each configured for accessing and reading associated computer-readable media having stored thereon data and/or computer-executable instructions for implementing the various methods of the invention. Generally, the financial data providers 208 may provide financial data for one or more financial accounts requiring certification. According to one embodiment of the invention, the financial data providers 208 may be associated with a financial institution ("FI"), which may generally include any third-party system storing financial data such as banks, brokerages, credit bureaus, financial aggregators, personal financial management software, mortgage companies, Governmental Agencies, and the like. According to another embodiment of the invention, the financial data providers 208 may also include providers of non-financial data such as identity data. According to yet another embodiment of the invention, the financial data provider 208 may be the requesting/receiving system 202.

Generally, network devices and systems, including one or more requesting/receiving systems 202, certification systems 204, and financial data sources 208 have hardware and/or software for transmitting and receiving data and/or computer-executable instructions over a communications link and a memory for storing data and/or computer-executable instructions. These network devices and systems may also include a processor for processing data and executing computer-executable instructions, as well as other internal and peripheral components that are well known in the art. As used herein, the term "computer-readable medium" describes any form of memory or a propagated signed transmission medium. Propagated signals representing data and computer-executable instructions are transferred between network devices and systems.

Still referring to FIG. 2, a requesting/receiving system 202 may be in communication with the certification system 204 via a network 210, which as described below can include one or more private and public networks, including the Internet. Likewise, the certification system 204 may also be in communication with a financial data provider 208 via the network 210. According to an embodiment of the invention, the requesting/receiving system 202, the certification system 204, and the financial data provider 208 may be in direct communication with each other. Each of these components—the requesting/receiving system 202, the certification system 204, the financial data provider 208, and the network 210—will now be discussed in turn below.

First, the requesting/receiving system 202 may be any processor-driven device, such as a personal computer, laptop computer, handheld computer, and the like. In addition to having a processor 220, the requesting/receiving system 202 may further include a memory 212, input/output ("I/O") interfaces 214, and a network interface 216. The memory 212 may store data files 218 and various program modules, such as an operating system ("OS") 220, a database management system 218 ("DBMS"), and a communications module 222. The communications module 222 may be an Internet browser or other software, including a dedicated program, for interacting with the certification system 204. For example, a user such as a customer 206, credit bureau, financial institution or mortgage company, may utilize the communications module 222 in requesting electronic account certification report or order the certification system 204 to process credit interest matches. The requesting/receiving system 202 may also utilize the communications module 222 to retrieve or otherwise receive data from the certification system 204, including application or availability of an electronic account certification, total financial report or credit interest match, as described herein, for the certification and reporting request.

Still referring to the requesting/receiving system 202, the ("I/O") interface(s) 214 facilitate communication between the processor 210 and various ("I/O") devices, such as a keyboard, mouse, printer, microphone, speaker, monitor, bar code readers/scanners, RFID readers, and the like. The network interface 216 may take any of a number of forms, such as a network interface card, a modem, a wireless network card, and the like. These and other components of the requesting/receiving system 202 will be apparent to those of ordinary skill in the art and are therefore not discussed in more detail herein.

Similar to the requesting/receiving system 202, the certification system 204 may include any Processor-driven device that is configured for receiving, processing, and fulfilling requests from the requesting/receiving system 202 related to financial account certification and reporting and credit interest matching, described herein. The certification system 204 may therefore include a processor 226, a memory 228, input/output ("I/O") interface(s) 230, and a network interface 232. The memory 228 may store data files 234 and various program modules, such as an operating system ("OS") 236, a database management system ("DBMS") 238, and the communications module 240. According to an embodiment of the invention, the data files 234 may store history records or tables associated with one or more electronic account certifications. The data files 234 may also store routing tables for determining the subsequent transmission of electronic account certification imports. For example, these routing tables may determine that particular certification requests are associated with certain financial institutions, and therefore specify a particular financial data provider 208 to request financial account data from. The communications module 240 initiates, receives, processes, and responds to requests from the respective communications module 222 of requesting/receiving system 202, and further initiates, receives, processes, and responds to requests from the respective communications modules 272 of the financial data provider 208. The certification system 204 may include additional program module for performing other pre-processing or post-processing methods described herein. Those of ordinary skill in the art will appreciate that the certification system 204 may include alternate and/or additional components, hardware or software.

As illustrated FIG. 2, the certification system 204 may include or be in communication with at least one data storage device 242, or databases. If the certification system 204 includes the data storage device 242, then the data storage device 242 could also be part of the memory 228. The data storage device 242 and/or memory 228 may store, for example, program rules and transaction records (e.g., history records) and/or financial account access information (e.g., account numbers, login id, passwords, security questions, etc.) associated with the account certification requests and credit interest matches. Although a single data storage device 242 is referred to herein for simplicity, those skilled in the art will appreciate that multiple physical and/or logical data storage devices or databases may be used to store the above mentioned data. For security and performance purposes, the certification system 204 may have a dedicated connection to the data storage device 242. However, the certification system 204 may also communicate with the data storage device 242 via a network 210, as shown. In other embodiments of the invention, the certification system 204 may include the data storage device 242 locally. The certification system 204 may also otherwise be part of a distributed or redundant database management system ("DBMS").

Similarly, the financial data provider 208 may include any processor-driven device that is configured for receiving, processing, and fulfilling requests from the certification system 204 related to the requests for electronic account certification reporting. The financial data provider 208 may therefore include a processor 258, a memory 260, input/output ("I/O") interface(s) 262, and a network interface 264. The memory 260 may store data files 266 and various program modules, such as an operating system ("OS") 268, a database management system ("DBMS") 270, and the communications module 272. The host module 272 initiates, receives, processes, and responds to requests from communications module 240 of the certification system 204. The financial data provider 208 may include additional program modules for performing other pre-processing or post-processing methods described herein. Those of ordinary skill in the art will appreciate that the financial data provider 208 may include alternate and/or additional compounds, hardware or software.

The network 210 may include any telecommunication and/or data network, whether public, private, or a combination thereof, including a local area network, a wide area network, an intranet, an internet, the Internet, intermediate hand-held data transfer devices, and/or any combination thereof and may be wired and/or wireless. The network 210 may also allow for real-time, off-line, and/or batch transactions to be transmitted between the requesting/receiving system 202 and the certification system 204. Due to network connectivity, various methodologies as described herein may be practiced in the context of distributed computing environments. Although the requesting/receiving system 202 is shown for simplicity as being in communication with the certification system 204 via one intervening network 210, it is to be understood that any other network configuration is possible. For example, intervening network 210 may include a plurality of networks, each with devices such as gateways and routers for providing connectivity between or among networks 210. Instead of or in addition to a network 210, dedicated communication links may be used to connect the various devices of the invention. According to an embodiment of the invention, the network 210 may comprise one or more of an electronic funds transfer ("EFT") network, an automated clearing house ("ACH") network, an open financial exchange ("OFX") network, a society for worldwide interbank financial exchange ("SWIFT") network, a credit card network, a proprietary bank network, a proprietary credit network, or a proprietary credit authorization network.

Aspects of the electronic account certification and reporting methods described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the application integration method include: microcontrollers with memory (such as EEPROM), embedded microprocessors, firmware, software, etc. Furthermore, aspects of the described method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

Those of ordinary skill in the art will appreciate that the system 200 shown in and described with respect to FIG. 2 is provided by way of example only. Numerous other operating environments, system architectures, and device configurations are possible. Accordingly, the invention should not be construed as being limited to any particular operating environment, system architecture, or device configuration.

Information received by the certification system 204 from customers 206, requesting systems 202 and financial data providers 208 may include a plurality of data elements and may be individual customer and/or businesses related data, financial and non-financial data, historical and real-time data, or other information that would be considered for use by credit lenders or financial accountants. Systems described herein can be used with any type of account. Example asset accounts may include checking accounts, money market accounts, CDs, mutual funds, stocks (equities), bonds, and other alternative investments. Example debt accounts may include mortgage accounts, home equity loans, credit card accounts, personal loans, margin accounts, overdraft protection, and other types of loans. Example additional accounts include tax data, personal financial management software data, or accounting software data, for example.

Global Data Download

Figure 3A:
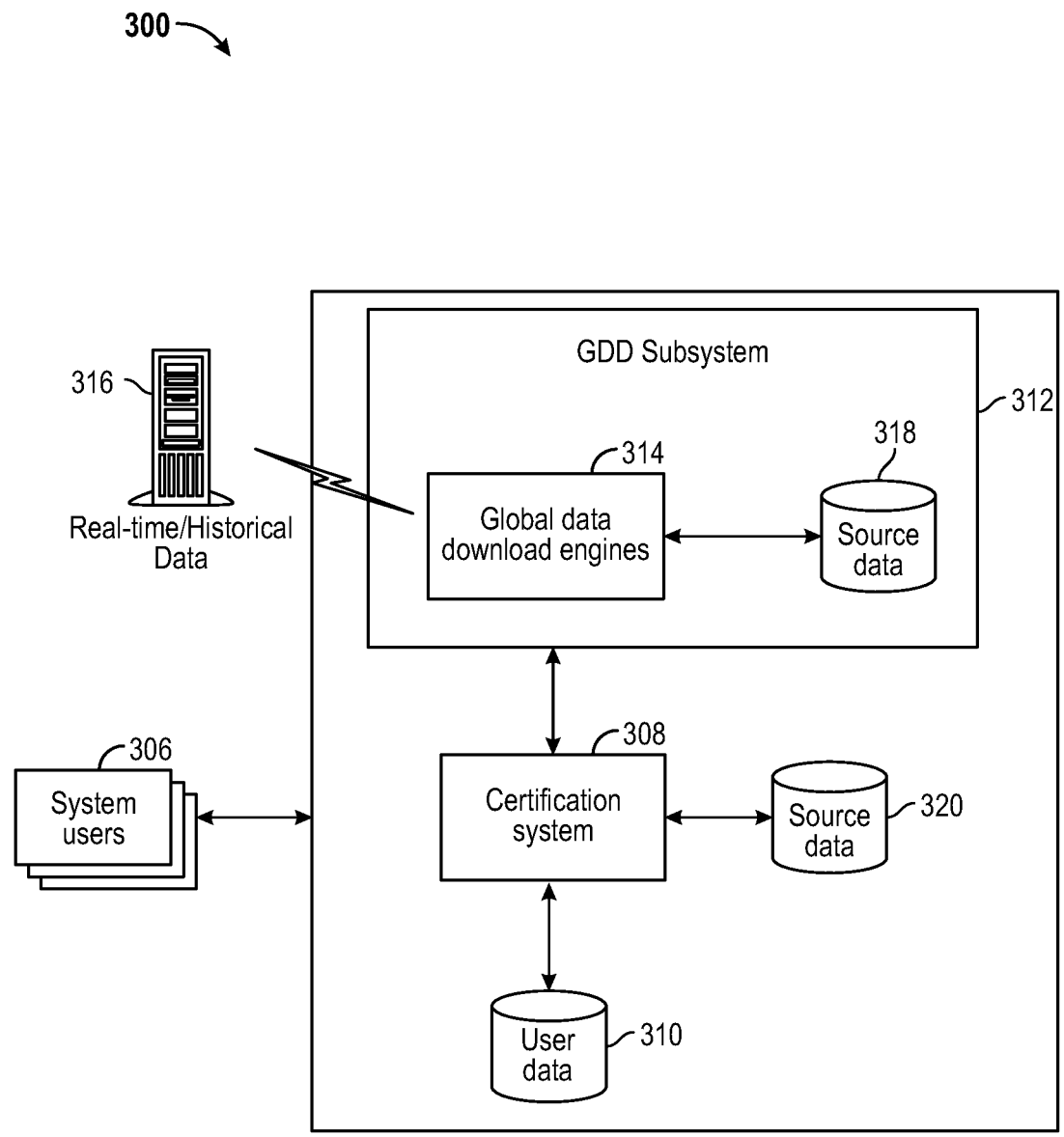
FIGS. 3A-3B provide block diagrams illustrating one example of global data download and Real-time data mapping of downloaded data, according to an embodiment of the invention.

Referring now to FIG. 3A, there is shown a block diagram of one example embodiment of certification system components 200. The system 300 may include the certification system 308, user data 310, stored data 320 and global data download subsystem 312, further coupled to source databases 318. Also depicted for illustrative purposes are requesting/receiving systems 306 and financial data providers 316. The operation of and interrelationship of certification system 308 coupled to global data download engines 314 are described in greater detail below as part of a discussion of data download and mapping functions.

There are many ways in which systems of the invention can receive financial data. For example, in one example embodiment, requesting/receiving system users 306 may provide the system 300 lists of financial institutions with which the user has relationships, and the system may retrieve information directly from the financial data providers 316. In another example embodiment, requesting/receiving system users 306 may select financial institutions from lists provided by the system 300. In other example embodiments, systems of the invention may electronically import information about the requesting/receiving system users 306, such as social security number (SSN), or unique identifying information about financial data providers 316, such as account number or employer identification number (EIN), or such other equivalent identifiers as may be appropriate for different types of financial institutions. Systems of the invention may determine whether financial data providers 316 associated with identifying information are able so provide data related to the request from system users 306. If so, then systems of the invention may retrieve, analyze, certify, and report that historical and real-time data and use it to transmit electronic account certifications and electronic authorize and optimize credit and loans.

Overview

Systems of the invention may incorporate user interview processes to collect information, but is not required because ("GDD") 312 enables electronic download of data with minimal user inputs. For example, requesting/receiving systems 306 may electronically transmit required information to certification system 308 which may initiate electronic ("GDD") 312. When used, interview processes may incorporate user interface (UI) components for interacting with systems of the invention. In example embodiment, systems of the invention may be implemented in desktop software, and UI of interview processes may be displayed when software is started. In another example embodiment, systems of the invention may exist as part of a web service, and interview processes may comprise a plurality of web pages. Regardless of implementation, systems of the invention may communicate with users to obtain and present data about users relevant to electronic account certifications, real-time total financial reporting, and electronic credit interest matching.

Systems of the invention may approach returning users from perspectives that change in financial accounts and identity information is unlikely or infrequent. Interviews may allow users to update items by importing or manually entering information and then move on to items that users identity as having changed. For new users, interview systems may build a profile that can be used to year after year and sections may be automatically identified and avoided. Even if users indicate that a particular area does not apply, systems of the invention may automatically perform ("GDD") to determine if a user's indication is true or false. Summary screens may be presented to users containing information identified as skipped and offering users a chance to provide complete and updated information.

Data is imported using ("GDD") 312. ("GDD") 312 enables seamless import of data from a variety of financial data providers 316 into the certification system 308. In one example embodiment, data to be imported is provided by financial data providers 316 in formats of ("EAC") data structures. A data mapping language may map real-time data of ("EAC") data structures to various fields in order to electronically analyze, certify, and score that real-time data. Imported data is stored as source data 318 and may be checked automatically for completeness, and in one embodiment, data that is missing or incomplete is identified as exceptions requiring attention before another process may be performed, such as a credit authorization, for example, ("GDD") 312 enables just-in-time styles of data downloads whereby data can be downloaded electronically in real-time by connecting to financial data providers 316 on as-needed basis to obtain data, instead of monthly download processes. Furthermore, ("GDD") 312 enables complete styles of data downloads whereby data obtained may consist of asset, income, tax, and any other type of data not available on credit reports.

Information about requesting/receiving system users 306, including their identity verification and their relationships with financial institutions, may be stored and used to create a profile for each requesting/receiving system users 306 which may be stored as user data 310. A profile enables systems of the invention to streamline any type of process provided by systems of the invention by asking fewer questions or none at all, instead of requiring requesting/receiving system users 306 to re-enter data that has not varied. A summary of skipped financial data providers 316 may be provided to requesting/receiving system users 306 to ensure that no data has been inadvertently omitted. For new requesting/receiving system users 306, default profiles may be used initially to focus any process according to most likely areas of relevance to a particular user based on information, including age, employment etc., while simultaneously ensuring complete and accurate information is obtained, including asset and debt accounts users may not wish to provide system access.

As data is downloaded, ("GDD") engines 314 recognize download data by source 316 and may provide feedback to users via communications interfaces that indicate levels of completeness and accuracy of downloaded data 320. For example, a credit seeker may attempt to manipulate electronic account certification by disclosing account access to only "preferred" accounts. The certification system 308 continuously communicated in real-time with ("GDD") engines 314 to identify and exception any attempted system manipulations. Table 1 below provides examples of user actions required and system exception levels, given levels of completeness, sources of data, and assumptions made about accuracy of data:

TABLE 1

| Description | # User Identified | # Sytem Identified | Action required |
|---|---|---|---|
| Asset | 3 | 5 | ("GDD") obtains missing items; User required inputs. |
| Debt | 1 | 4 | ("GDD") obtains missing items; User required inputs |
| Income | 5 | 2 | User required inputs |
| Expense | 4 | 5 | User required inputs |

To eliminate data redundancy and increase data accuracy and completeness, ("GDD") engines 314 may select the most reliable sources of data 316 automatically. Table 2 provides examples of privacy and secondary sources for information that may be accessible by ("GDD").

| Description | # User Identified | # Sytem Identified | Action required |
|---|---|---|---|
| Asset | 3 | 5 | ("GDD") obtains missing items; User required inputs. |
| Debt | 1 | 4 | ("GDD") obtains missing items; User required inputs |
| Income | 5 | 2 | User required inputs |
| Expense | 4 | 5 | User required inputs |

Real-Time Data Mapping

Figure 3B:
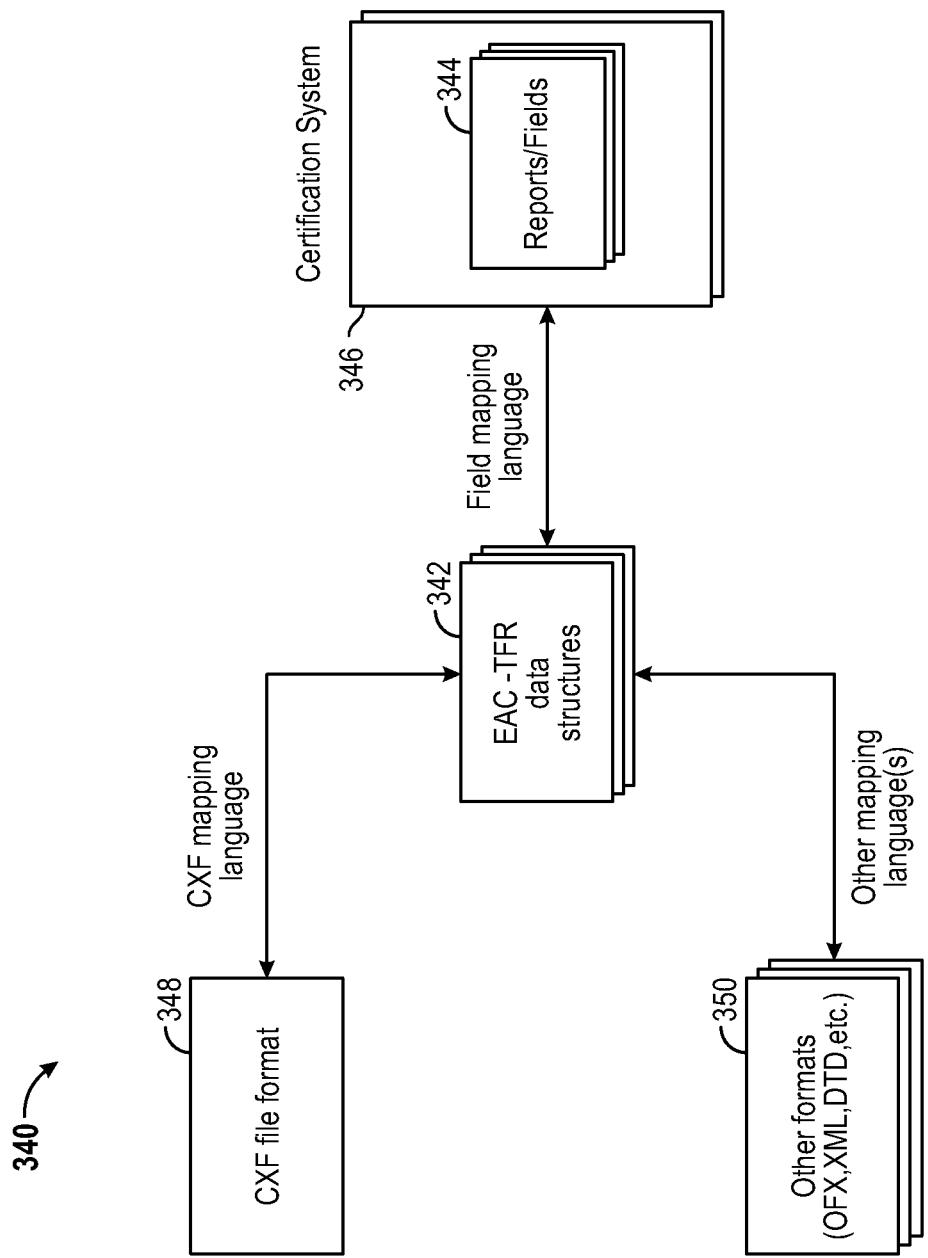

Real-time data mapping describes a path of downloaded data from download sources into system modules. In one example embodiment, and referring now to FIG. 3B, Systems of the invention may provide support for download of data stored in multiple formats. In order to achieve this support, systems of the invention may provide a customized and proprietary standard for the system data structures 342. Proprietary system data structure 342 languages may be independent of reports and file formats, and may map data into appropriate reports and fields 344 of various system fields and reports, in order to electronically certify and report real-time data which may be used to respond to credit applications. Since data may be stored in various formats, e.g. Certification Exchange Format ("CXF"), Open Financial Exchange ("OFX") 350, Extensible Markup Language ("XML") 350, Document Type Definition ("DTD") 330, etc., additional mappings and conversion algorithms may be used in order to convert electronically obtained and stored data into ("EAC") data structures 342. Thus, by making ("EAC") data structures 342 available to download sources such as financial institutions and financial management software, it is possible for ("GDD") to accept data from a wide range of sources in order to perform import of historical and real-time financial and identity data. A new format merely requires a new mapping from that format into ("EAC") data structures 342. Mapping from ("EAC") data structures to reports and fields 344 of databases is unaffected. Furthermore, download user interfaces may be built around ("EAC") data structures 342 so that it is independent of formats of downloaded data.

System data structure language 342 may define downloadable records and values, and structures of downloadable data. That is, depictions of downloadable data independent of its representation either on reports or in formats such as a proprietary certification exchange format ("CXF") format made publicly available. In one example embodiment, downloadable languages may include support for any one or more of the following features: Representing a value Representing a group of values Associating an ID with a group of values. Representing a group of values as a child of another group of values Representing a group of values or a value that there can be only one of (single cardinality) Representing a group of values or a value that there can be many instances of (multiple cardinality) Representing an instance of a group of values or value with a dynamic text representation. This text representation may contain values from the group of values or value as well as the quantity of child groups of values or values.

In one example embodiment, ("CXF") mapping language maps ("CXF") format 348 into ("EAC") data structures 342. It may utilize records and fields available in ("CXF") format 348 to fill in instances of ("EAC") data structure 342. In one example embodiment, ("CXF") Mapping Language includes support for the following features: Collating ("CXF") transactions based upon a set of keys (including constants) Separating ("CXF") transactions Creating unique ("EAC") data instances for every ("CXF") transaction Utilizing information from the ("CXF") detail record if it exists Assigning data such as class and names to ("EAC") data values Conditionally assigning, ("EAC") data values based upon presence of a field in ("CXF") records. Conditionally assigning ("EAC") data values based upon data ranges of ("CXF") records. Assigning constant values to ("EAC") data values.

Fields mapping languages may map ("EAC") data structures 342 into reports and fields. In one example embodiment, two data structures may have common representation of single cardinality and multiple cardinality values and records. Fields mapping language may bridge gaps and allows movement of ("EAC") data structures into reports and fields of ("EAC") systems. Fields mapping languages may include support for one or more of the following features: Associating a single instance value with a single field. By implication, this action replaces any data on that single field. This is a one to one mapping. Associating a group of single instance values with a group of fields (potentially on different forms). This is really a one to one mapping as well where an importable instance contains more than one value that all go to specific places. By implication, the values on fields are replaced by downloadable values. Associating a multiple instance value with a single field. By implication, this action replaces any data on that single field. This is a many to one mapping. Associating a multiple instance value with a set of fields on reports. This is a many to many mapping. Many-to-many mappings allow data on reports to co-exist with imported data. As such, downloads may or may not imply replacement of data.

Associating a multiple instance value with an array on a report. This is a many to many mapping. Associating a multiple instance group of values with a set of fields. This is a many to many mapping.

Associating a multiple instance group of values with a set of arrays. This is a many to many mapping.

Associating a multiple instance group of values with a table. This is a many to many mapping.

Figure 4A:
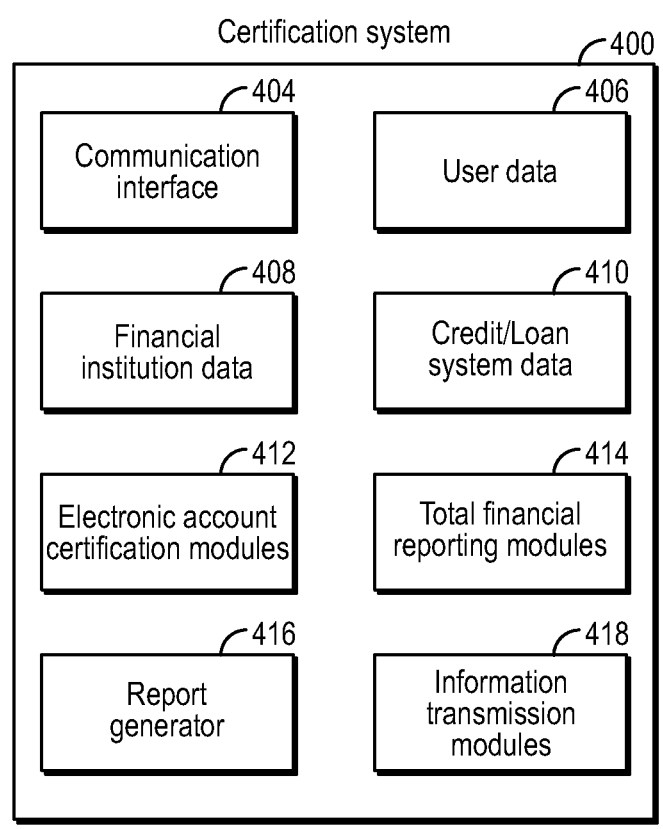
FIGS. 4A-4B provide block diagrams illustrating one example of components and modules of a system that electronically certifies and reports financial data, according to an embodiment of the invention.

FIG. 4A is a block diagram 400 showing one example of modules of an electronic account certification and reporting system in accordance with one example embodiment of the invention. Modules and components of systems of the invention may, however, be embodied in many different forms and should not be construed as limited to the embodiments set forth herein; rather these embodiments are provided so that this disclosure will be thorough and complete, and will fully convey the scope of the invention to those skilled in the art. Embodiments of the invention may feature communication interfaces 404 allowing systems of the invention to communicate with other computer systems such as servers, client computers, and portable computing devices. Communication interfaces 404 may be network interfaces to LANs, which may be coupled to other data communication networks, such as the Internet.

Systems of the invention may store user date 406, such as account information, user information, banking login name and password, account access and authentication information, for example. Additionally, user data may include any data previously electronically obtained and any reports electronically generated. Systems may store financial institution data 408 such as bank, tax, and marketplace data, for example. Systems may also store credit and loan data 100 such as buyer/seller data, credit reports, verification reports, real-estate information, etc.

("EAC") modules 413 may analyze any type of real-time and historic user data 400, financial institution data 408 and credit/loan data 100 downloaded. ("EAC") modules 412 apply rigorous certification logic rules to real-time and historically financial data to insure the data is complete, accurate and compliant. ("EAC") modules 412 may output "certified data" for use by one or more system modules, such as ("TFR") modules 414, for example. Information from one or more modules may be used by report generators 416 to display information to users. ("TFR") modules 414 may analyze any type of real-time and historic user data 406, financial institution data 408 and credit/loan data 410 downloaded.

Information transmission modules 418 may output any type of information to any type of system or user. Example information transmission modules module 418 functions include transmitting electronic account certifications, transmitting total financial reports, new credit authorizations, update existing credit authorizations, transfer credit, move money, report information to markets, initiate transmission of system generated credit cards, initiate transmission of system applications and updates to mobile devices, transmit information to government and regulatory agencies, and transmit information to other authorized third-party users, for example.

Figure 4B:
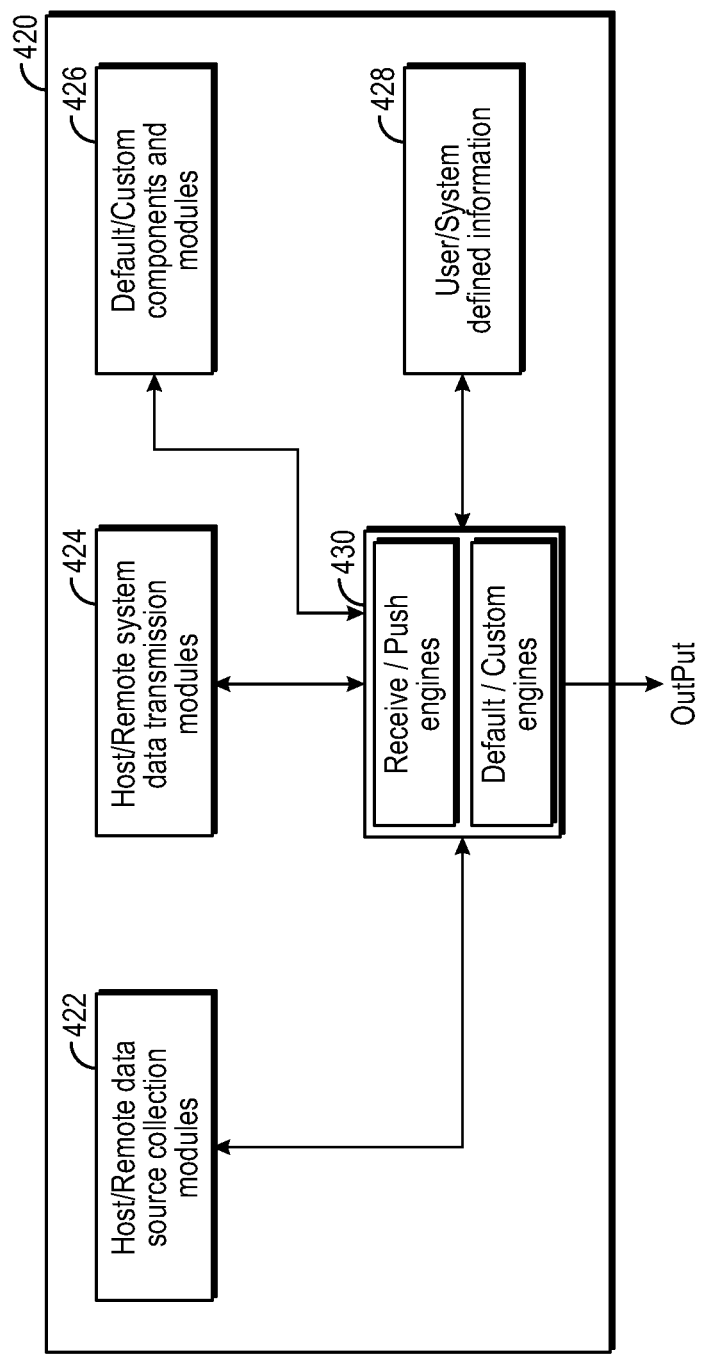

FIG. 4B is a block diagram 420 showing one example of various types of components, modules and engines of systems of the invention. Any system component module may reside on disparate systems around the World and communicate information in real-time with one or more system components or modules located on another disparate system around the World. Furthermore, any one system component or module may feature additional components and/or modules not illustrated herein. Data collection modules 422 may include capabilities for collecting data internally. Additionally, data collection modules 422 may include capabilities for collecting data externally from remote systems. Any module 424 may include capabilities for transmitting data to host and/or remote systems. Furthermore, any component may be default and/or custom 426. Logic used to analyze and certify data may user and/or system defined 428. System engines 430 may be default or custom and may "receive" and "push" information externally and internally. Further explanation of example system modules will be discussed in detail below.

Additionally, those skilled in the art will appreciate that systems of the invention show with respect to the above figures are provided by way of example only. Numerous other operating environments, system architectures, and device configurations are possible. Accordingly, the invention should not be construed as being limited to any particular operating environment, system architecture, or device configuration.

As discussed above with respect to FIGS. 1-4, embodiments of the invention can assist financial institutions in certifying that customer financial account information is complete, accurate and compliant with rules established by authorized users. Additionally, as discussed above with respect to FIGS. 1-4, embodiments of the invention can assist financial institutions by providing current and complete financial information associated with customers. The operation of example embodiments of the invention will now be described with references to the following figures.

Operational Overview

Figure 5:
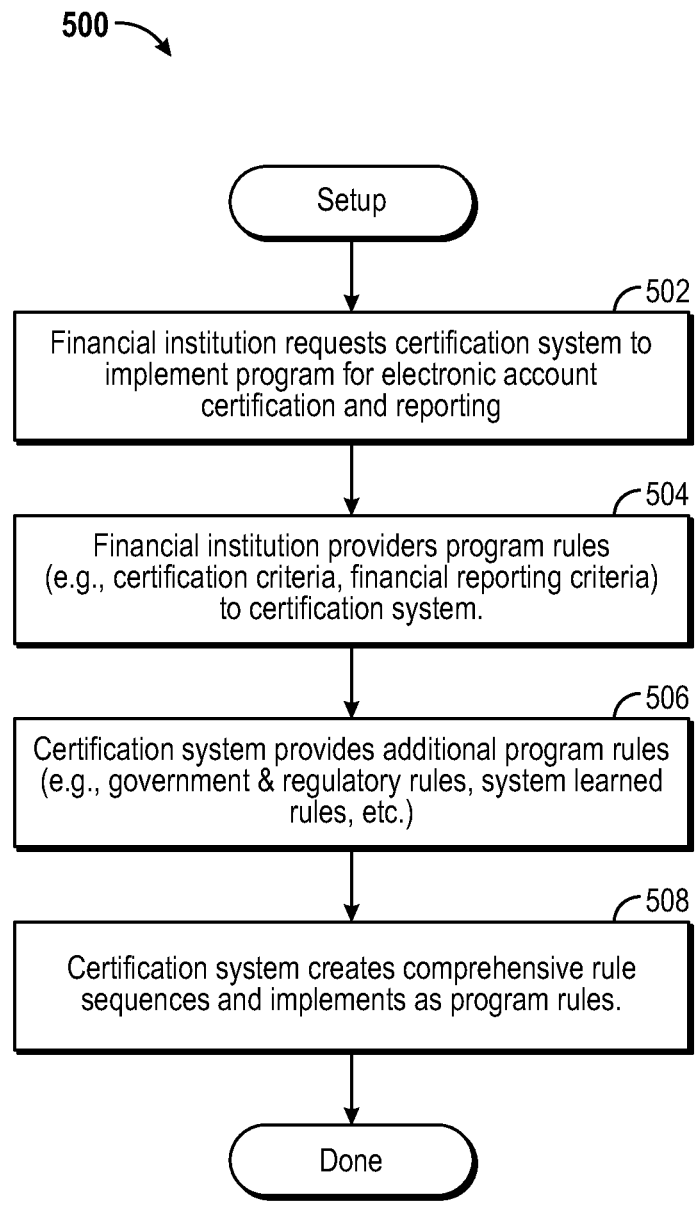
FIG. 5 provides an example method for program rule setup, data retrieval, and electronic account certification and reporting, according to an embodiment of the invention.

FIG. 5 illustrates a method 500 by which requesting/receiving systems and users 206 can set up program rules with a certification system 204 in order to customize electronic account certification and reporting. Referring to FIG. 5, a financial institution may request that a certification system 204 implement a program for electronically certifying and reporting information associated with one or more financial accounts accessed from one or more financial data sources 208. According to an embodiment of the invention, this request may be an electronic request (e.g., e-mail, messaging, direct communications, etc.) over network 210 between the certification system 204 and requesting/receiving 204 system and users 206. However, it will be appreciated that the request may also be made using facsimile, telephone, postal mail, and other electronic and non-electronic communication means know to one of ordinary skill in the art.

Still referring to FIG. 5, in block 504, the financial institution or user may provide program rules, which may certification criteria, financial reporting criteria, credit interest criteria information to the certification system 204. This information will be discussed below in accordance with the several illustrative embodiments. According to block 506, the certification system 504 may then implement the program rules. It will be appreciated that these program rules may be modified and/or updated by the financial institution or the certification system 504 from time to time. The implementation of the program rules by the certification system 504 will now be described in further detail below with respect several embodiments shown in FIGS. 6-8.

Figure 6:
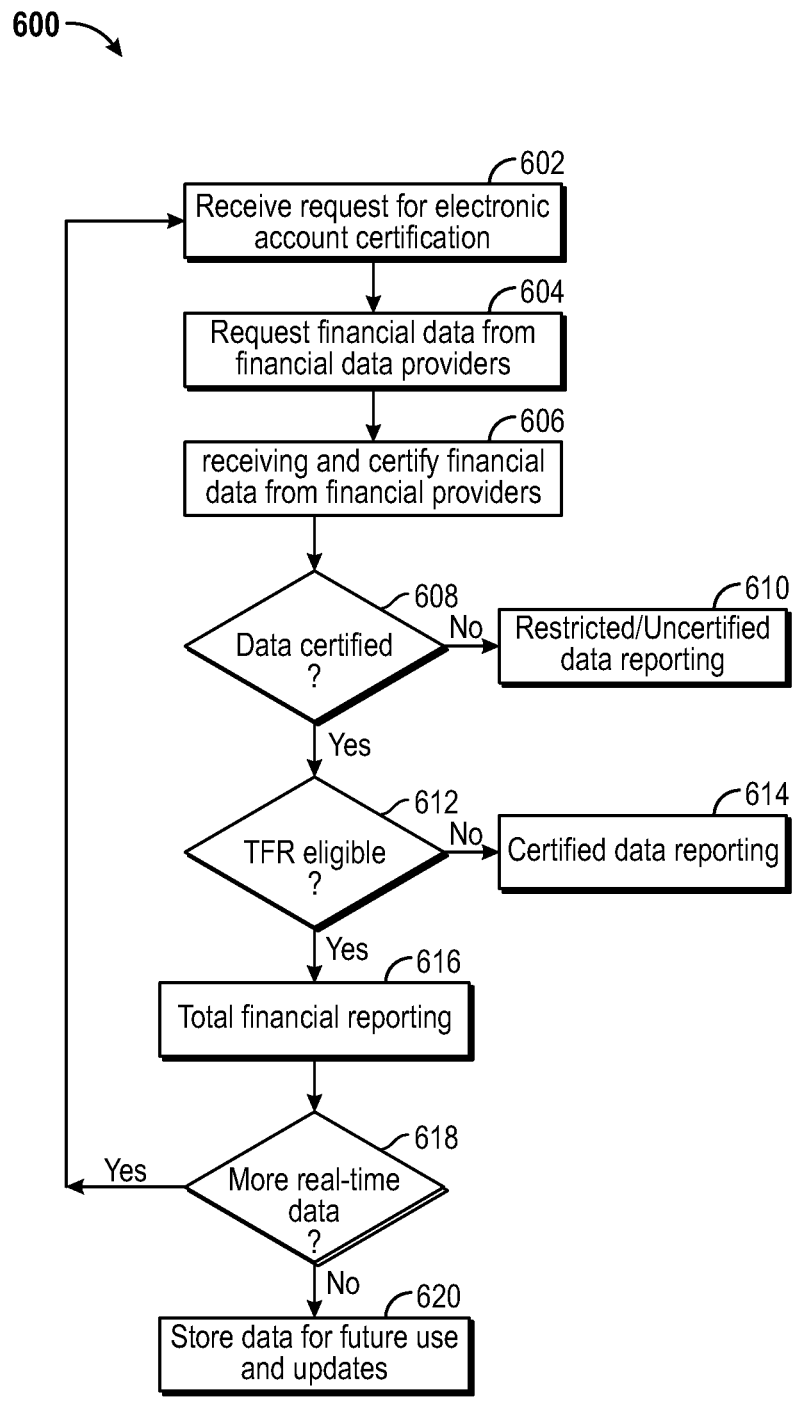
FIG. 6 is a flow diagram illustrating one exemplary method of continuously updating one or more reports as a function of receiving additional or updated financial data, according to an embodiment of the invention.

FIG. 6 illustrates a computer-implemented method 600 by which the certification system 204 operates to certify and report financial data electronically, according to one embodiment of the invention. In block 602, the certification system 204 may receive the electronic account certification request from the requesting 202 system via network 210 and I/O Interface 230. Generally, the customer 206 may submit a request via the requesting system 202, which is then transmitted to the certification system 204 in the form of an electronic account certification request.

In block 604, the certification system 204 may route the data request to the certification engines, which simultaneously transmit a data request to one or more financial data providers 208 as a function of receiving the certification request from the requesting 202 system via network 210 and I/O interface 330. According to an embodiment of the invention, the Financial Institution Name, Accounting Number, User Id, Password and Challenge Answer may specify which financial data provider 208 the certification system 204 should access. According to another embodiment or the invention, the certification system 204 may also include a routing table, perhaps stored in memory 228 or data storage device 242, for determining which financial data provider 208 should be accessed. In yet another embodiment, the account holder's social security number or information transmitted via swiping a card or syncing a mobile device at a merchant location may be sufficient information for the certification system 204 to access a plurality of financial data sources 208 simultaneously. As described above, the financial data provide 208 may be associated with a financial institution associated with one or more accounts requiring certification.

In block 606, the certification system 204 may receive the requested financial data from the financial data source 208 and electronically certify the financial data. If the at least one required data source was accessed, the citification system 204 may receive financial data from the financial data source 208. However, if the at least one required financial data source was not accessed, then the certification system 204 may not receive financial data from the financial data source 208 (block 606).

Accordingly, if block 608 determines that the financial data was certified, then processing proceeds with block 610, where the certified data (e.g., historical and real-time may be transmitted by the certification system 204 to the requesting 202 computer via network 210 and respective I/O interfaces 230, 214. Accordingly, in this situation the requesting computer 202 may also be called the receiving 202 computer because it has requested and received the electronic account certification. In other embodiments, a plurality of computers may receive the electronic certification without having first requested the electronic account certification. For example, a mortgage broker may request the certification and the certification may simultaneously transmit the certification to the underwriter, mortgage applicant and mortgage broker. In an alternative embodiment of the invention, block 610 may also include determining whether the data was not certified (e.g., indicated inaccurate, incomplete or non-compliant, etc.) and providing indication of restricted use of data.

On the other hand, block 608 may determine that the data has been approved by the certification system 204. In this situation, processing may continue with block 612 determining whether the certified data may still be eligible for partial or full total financial reporting ("TFR") by the certification system 204 under an exemplary program having associated program rules and which may be referred to as the ("TFR") program. It will be appreciated that the requesting 202 and receiving 202 systems may have incentives to utilize real-time total financial reports output by the certification system 202 (e.g., when seeking to improve credit lending risk management and liquidity, etc.).

Block 612, which will be described separately below, then determines whether the processed data is eligible for coverage under the exemplary total financial reporting and that eligibility determination of block 612 may be determined, at least in part, based on the analysis of the certification system 204. If the eligibility determination is performed by a system other than the certification system 204, then the certification system 204 may store the preliminary eligibility determination in a history table (e.g., stored in memory 228 or data storage device 242) for later retrieval.

If block 612 determines that the data is not eligible for total financial reporting, then the certification system 204 transmits a certification report (block 614) to the receiving system 202. On the other hand, if block 612 determines that the data is eligible for total financial reporting, then processing may continue with block 616. In other embodiments, the electronically transmitted certification report described in block 614 may also contain information which is not certified, such as information reported at block 610. For example, the certification system 204 may transmit consolidated information of a plurality of data sources, which are identified to be certified or restricted.

In block 616, the certification system 204 may transmit the certified data to a ("TFR") engine for processing of financial data in accordance with program rules. The ("TFR") engine output may then be transmitted to receiving systems 202. According to one embodiment, the electronically certified data may be viewed as more comprehensive and may be utilized instead of historical and incomplete credit reporting data. In cases where the initial request was for electronic certification only, the system may transmit at least a notice of availability of total financial reporting information to receiving systems 202 and may also store the information in a history table of the certification system 204 (e.g., in memory 228 or data storage device 242) for subsequent updates in response to new real-time data. According to an embodiment of the invention, block 316 may also include instructions to the requesting system 202 to submit a second request to obtain additional account certifications for the customer 206. For example, certification system 204 may have identified one or more financial accounts associated with the customer 206 which were not included in the initial request for account certification by the requesting system 202. In this case, the certification system 204 may transmit a request for additional authorization and authentication information to access the financial accounts.

Accordingly, in block 618, the certification system 204 may determine if additional real-time or near real-time data is available, which may require updating information and reports for transmission to the receiving system 202. In block 620, the certification system 204 may determine that currently no additional real-time data is available requiring updates and store the information for updates as a function of indications of new real-time or near real-time data.

It will be appreciated that variations of the method 600 are available without departing from embodiments of the invention. For example, according to an alternative embodiment of the invention, the certification system 204 may automatically perform block 620 after determining that the data is ("TFR") eligible in block 612. Yet other variations are possible without departing from embodiments of the invention.

Electronic Account Certification ("EAC")

Background information describing example functionality of electronic account certification is provided herein by way of reference and to facilitate the understanding of the electronic account certification method. Those of ordinary skill in the art will appreciate that the computer-implemented certification methods described herein are provided by way of example only. Accordingly, the overview information and flow diagrams should not be construed as being limited to any particular order or limited to any particular calculation.

Overview

One advantage of the system is that it enables real-time analysis and electronic systems for detecting if users fail to provide the systems total account access, in one embodiment requiring little or no user input. If is important to electronically certify accounts before processing certified information to ("TFR") modules and other systems. ("EAC") is a new system for electronically determining that users have provided complete and accurate information related to financial institutions before the systems process real-time data to ("TFR") module and other systems. Systems also contain authentication and fraud detection functionality for identity verification and fraud detection.

In one implementation any one or more of the following example components may comprise systems of the invention:
Electronic Asset Account Certification (EAAC)
Electronic Liability Account Certification (ELAC)
Electronic Income Certification (EIC) Electronic Expense Certification (EEC)
Electronic Tax Return Certification (ETRC) Electronic Real-Estate Valuation Certification (ERVC)
Electronic Identify Certification (EIC)
Electronic Fraud Certification (EFC).

The understands that users may attempt to manipulate the system by understating debt/expense information and/or overstating asset/income information. It is important for system users to obtain certified real-time asset, debt, income and expense data not reported by credit bureaus before processing the data. ("GDD") engines continuously transmit data to ("EAC") modules to analyze and detect missing and/or inaccurate information. This may be accomplished in one or more ways, such as electronically accessing data sources through an open financial exchange ("OFX") or automated clearing house ("ACH") networks. In one example embodiment, ("GDD") engines may periodically download historical credit report flies from credit reporting agencies, seen as Equifax™ of Atlanta, Ga. and electronically check debt accounts received by ("GDD") with debt accounts reported by credit reporting agencies. In one example embodiment, the certification system 204 provides indications of discrepancies between ("EAC") debt data and credit reporting data, which may provide a better system for detecting identity theft in real-time, for example.

Missing information may be electronically obtained without user input. Systems of the invention also continuously checks account information with secondary sources to determine that accounts belong to system users. Furthermore, the system electronically identifies prohibited and unusual transactions by electronically receiving government rules and user rules, which are used to create rule sequences for electronic identification of prohibited and unusual transactions. System logic may be used by the system and applied to historical and/or real-time data to determine how and what data is certified and what users are authorized access to data, for example. Analysis logic may also be applied to data and may trigger exceptions identifying information requested by one or more users, for example.

A particular user may customize logic or may select electronically generated system default logic. A system may receive logic rules from government entities or particular users which may establish logic rules used to identify information, such as prohibited transactions, for example. Logic rules selected for a particular user may be different than logic rules chosen by a different user having access a certification system. For example, a particular set of logic rules selected by a mortgage broker may differ from logic rules of underwriters for loans submitted by a mortgage broker.

Systems of the invention may store information about users which may update logic rules in real-time and recommend optimized logic electronically. Electronically optimized and recommended logic may be stored with other logic rules and selected by authorized users without disclosing sources used to electronically optimize and recommend logic. Any type of logic or rule sequence may be implemented to trigger exceptions and examples are provided herein for purposes of explanation only and should not be viewed in a limiting sense. One or more systems may communicate enterprise-wide master files which may contain any type of data that may be used by systems to electronically define and recommend particular sets of logic rules in real-time.

In one implementation any one or more of the following example certification logic may electronically trigger system exceptions identifying specific information:
Balance change unusual.
Transactions unusual and/or prohibited (ex. Related party transactions or seller "kick-backs")
User supplied information doesn't match electronically obtained information
Accounts accessed do not belong to system users
Information supplied by one user doesn't match information supplied by other users
Electronically obtained debt data does not match debt data reported by credit reporting agency
All user accounts not accessed
Real-time financial data changes
Electronic tax return from software doesn't match government reported tax return
Electronic fair market valuation from one source doesn't match secondary source.

Additionally, the system constantly communicates with authentication and authorization modules to verify user identities and/or detect fraud, which may electronically trigger one or more of the following exceptions: Telephone reported as stolen Telephone number is a phone booth Address can not be verified and/or is reported stolen. Address is a prison, hotel/motel, post office, mail service, answering service, etc. User has fraud exceptions and/or fraud victim indicators Social security number can not be verified, reported stolen, belongs to a deceased individual, or never issued Credit reporting service can not verify user or credit report contains fraud exceptions Real-time financial data changes.

Exception items may display on reports consolidated with various information, which may be used by other users. Furthermore, items which trigger exceptions may factor into a scoring logic which may be used to approve or declining a certification and/or credit application. Scoring logic and outputs generated by scoring logic may be disputed by users and dispute notifications may be transmitted to other users simultaneously.

The electronic certification of financial data (block 608, FIG. 6) will now be discussed in detail with respect to FIGS. 7A-7E. In particular, FIG. 7A begins with block 702 receiving financial data from at least one financial data provider 208. At block 704 the system determines if the data obtained can be classified. If the data can not be classified, the system routes the unclassified data to the certification engines (block 706) and notes the data as unclassified. In another embodiment, the unclassified data may be labeled as restricted or sent to the requesting system 202 for approval before continuation of the certification process. The certification system 204 may include a list of classification combinations for determining whether the data can be classified. Examples of this are seen through import of financial data from personal financial management software or online banking sites, where the data may contain one or more identifiers, such as a negative sign indicating an expense.

Figure 7A:
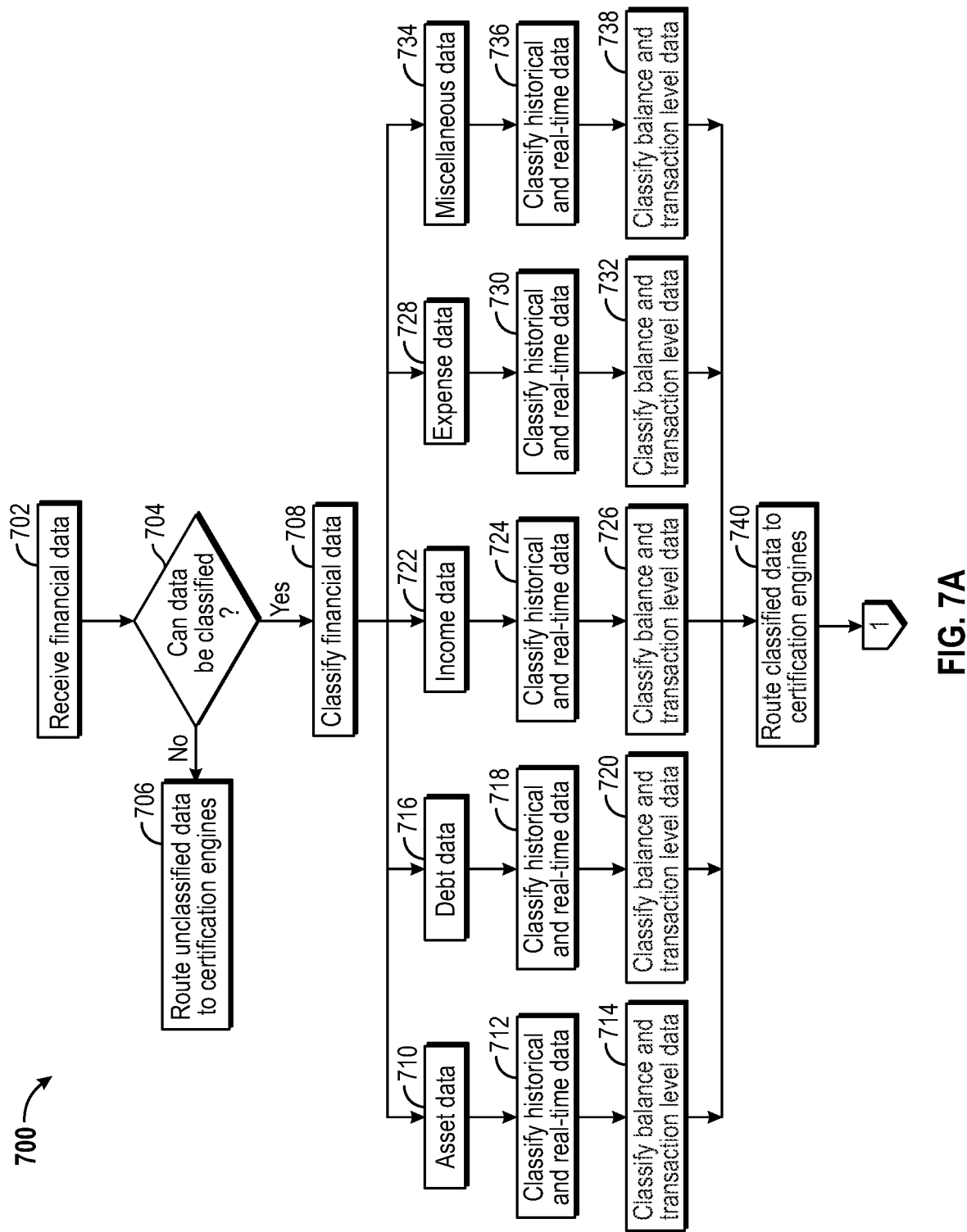
FIGS. 7A-7E provide example flow diagrams illustrating one exemplary method of continuously classifying and certifying financial data, according to an embodiment of the invention.

In another embodiment, the remaining steps of FIG. 7A may not be required when enough data is already obtained.

If the data needs to be classified (block 708), then the certification system 204 may determine if the data is asset data 710 and further determine if the asset data 710 is historical or real-time data 712. This process may continue as the certification system 204 further identifies if the asset data 710 is balance or transaction level data 714. If the data is debt data 716 a similar process may follow by determining if the debt data is historical or real-time 718, and may further comprise determining if the debt data 716 is balance or transaction level data 720.

If the data is classified as income data 722 or expense data 728, then the certification system 202 may also identify the income data 722 or expense data 728 with asset data 710 or debt data account 716. In response to real-time or near real-time data the certification system may continuously update the appropriate asset account 710 and debt account 716 in response to real-time income data 722 and expense data 728. The certification system 202 may also classify income 722 data and expense 728 data as real-time or historical income 724 or expense 730 data. Most likely real-time income 722 data and expense data will be automatically classified as transaction level income 726 data and expense 732 data. However, the certification system 204 retains the ability to sum transaction level information to provide a balance. Thus, income 722 data and expense 728 data may also be classified as balance data.

Many financial data providers 208 may provide the certification system 204 financial data winch is not considered asset 710, debt 710, income 722, or expense 728 data. In these cases, the certification system 204 may classify the data as miscellaneous data 734 and determine if the data is historical or real-time 736 and if the data is balance or transaction 738 data. In other cases, the certification system 204 may identify that the data is not financial data and apply program rules to classify the miscellaneous data as other types of information (e.g., address, social security number, account number, employer EIN, employer address, real-estate valuation, etc). The classified data is routed to the certification engines 740 for appropriate processing.

Figure 7B:
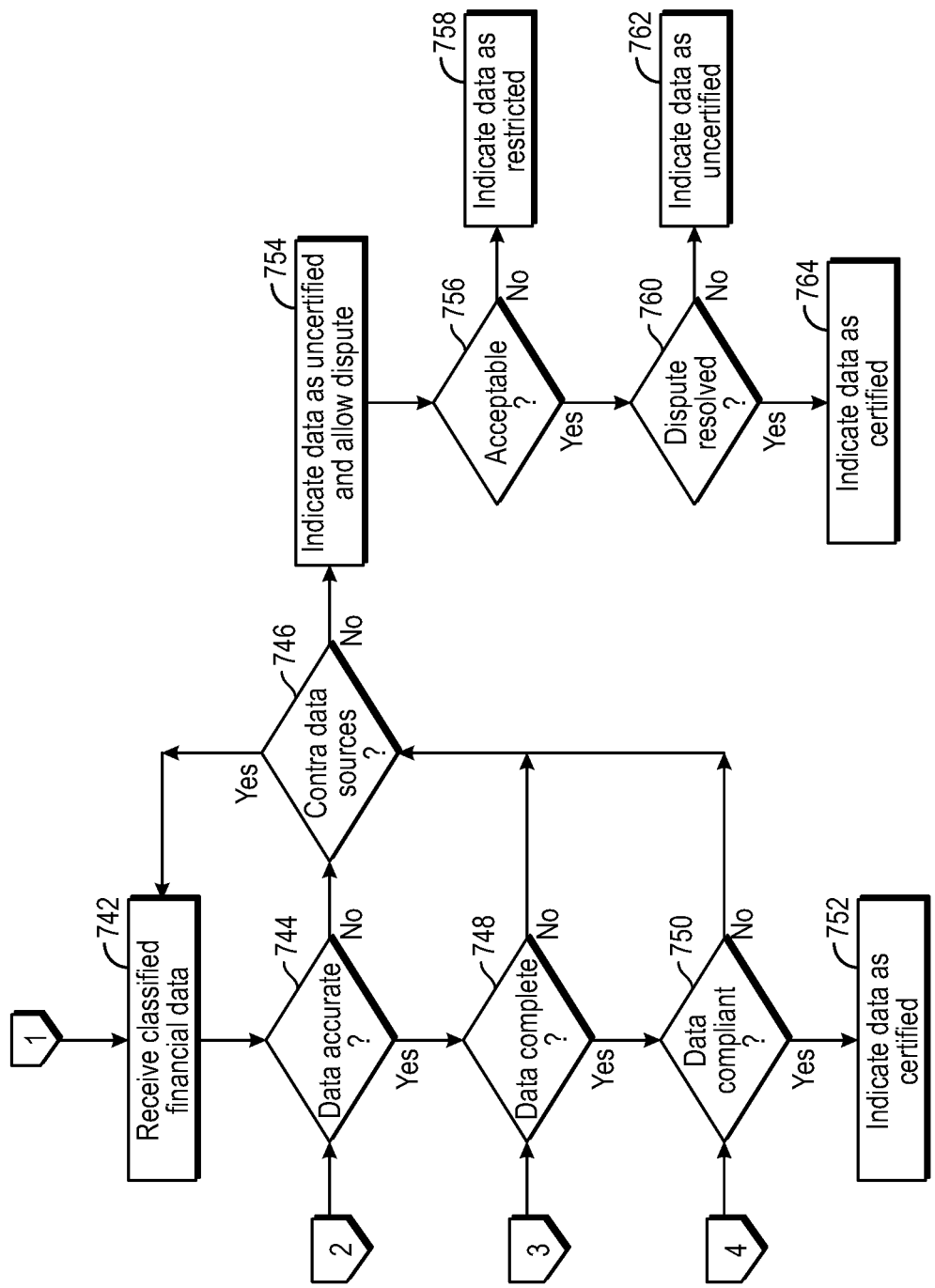

FIG. 7B continues the computer-implemented method of electronic account certification by receiving classified data at block 742. The classified data is continuously checked to determine if the data is accurate (block 744). Block 744 may also determine that the data is not accurate in which case processing may continue with block 740 determining whether contra financial data providers (e.g., customer 206) are available. For example, if accounts accessed do not belong to customers 206 or are not associated with the information transmitted from the requesting system 204, then the certification system 203 may determine the that the data is not accurate. Likewise, if the certification system determines the data is accurate, then at block 748 the data may be electronically evaluated to determine it the data is complete. Block 748 may also determine that the data is not complete in which case processing may continue with block 746 determining whether contra financial data providers are available. Likewise, if the certification system 204 determines the data is complete, then at block 730 the data may be electronically evaluated to determine it the data is compliant with program rules. Block 750 may also determine that the data is not compliant with program rules in which case processing may continue with block 746 determining whether contra financial data providers are available.

Block 752 may determine that the data is indicated as certified because it has at least met the minimum criteria established by program rules for electronic account certification, in which case the certified data is processed to determine if the data is eligible for ("TFR") processing (block 612, FIG. 6). According to an embodiment of the invention, the certification system 204 may determine if contra data providers exist (block 746) and indicate data as uncertified when contra data sources do not exist (block 754). Furthermore, when contra data sources do not exist and the data has been identified as inaccurate, incomplete or non-compliant, certification system 204 may provide users means to dispute the identification (block 754). IF block 756 determines the received financial data 742 is not acceptable for processing then the data is indicated as restricted (block 758), then the certification system 204 may determine that the data is not eligible for ("TFR") processing block 612, FIG. 6). On the other hand, block 756 may determine that partially incomplete, partially inaccurate, or partially non-compliant data is acceptable for processing and further determine if the dispute was resolved (block 760). In cases where the dispute is resolved, data may be indicated as certified data (block 764). On the other hand, in cases where the dispute cannot be resolved the data may be indicated as uncertified or restricted (block 762).

Figure 7C:
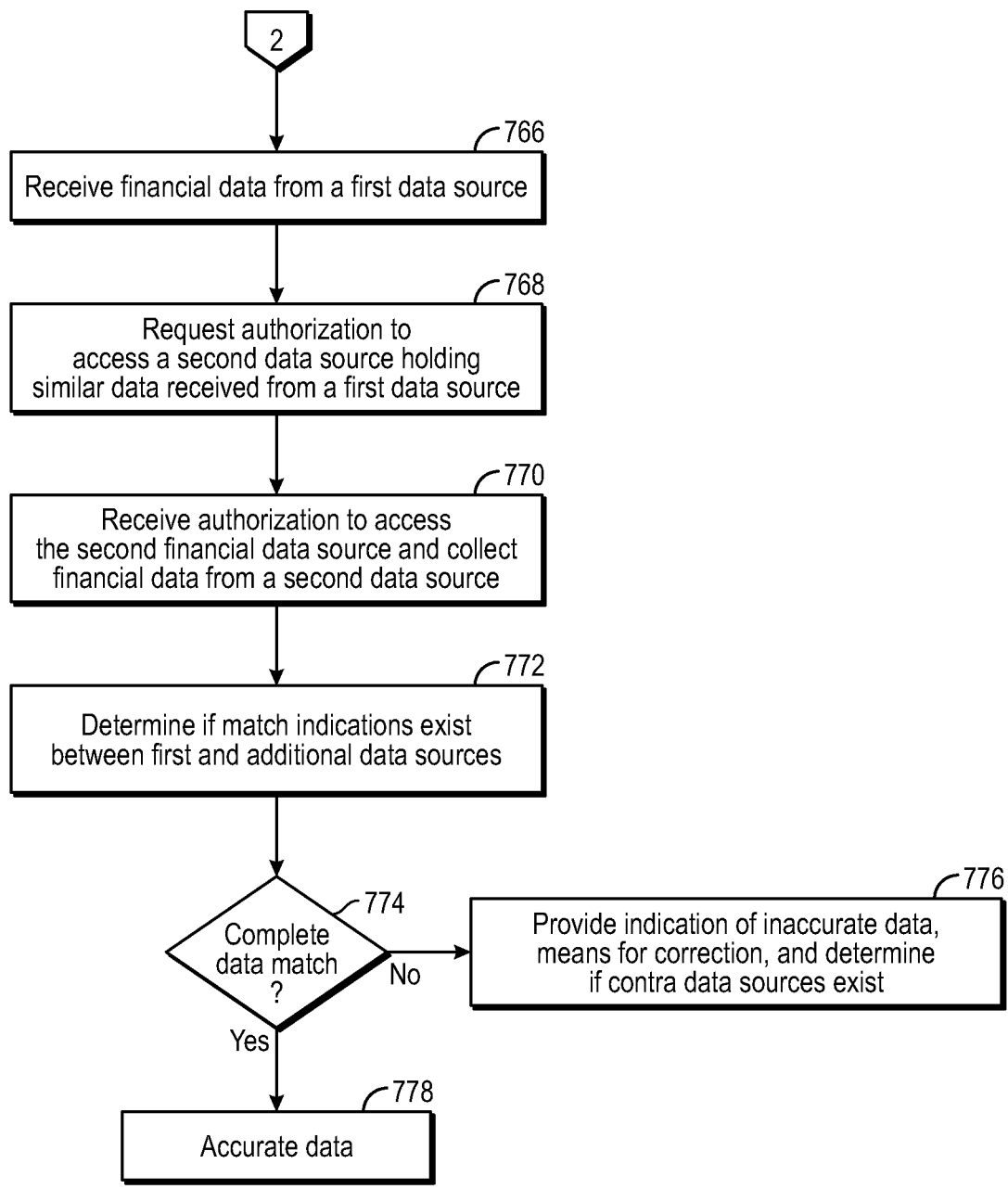

FIG. 7C illustrates one example computer-implemented method by which the certification system 204 operates to determine if financial account data obtained from the financial data source 208 is accurate, according to an embodiment of the invention. In block 766, the certification system 204 may receive financial data from a first financial data source 208 via network 210 and I/O Interface 230. Generally, the customer 206 and requesting system 202 may provide the certification system 204 information related to financial accounts (block 766), which is then used by the certification system 204 in the form of an electronic search for financial data providers 208 associated with the information received from the customer 206 and requesting system 202 (block 268). The certification system 204 may receive authorization to access the financial data providers 208 and collect financial account data associated with the financial account (block 770).

In block 772, the certification system 204 may electronically determine if information obtained from the financial data source 208 matches information obtained from the customer 206 and requesting system 202. In block 774, the certification system 204 may determine if a complete match is identified. If a complete match is identified, then the certification system 204 may indicate the data accessed from the financial account to be accurate (block 778). However, it the data is indicated to be at least partially inaccurate, then the certification system may provide customers 206 and requesting systems 204 means to correct the information and electronically determine it contra data sources exist (block 776). It will be appreciated that the certification system 204 may have a plurality of program rules to determine if data obtained from a financial data source 208 is accurate. Accordingly, if block 774 data to be inaccurate, then several different and alternative steps may be utilized by the certification system 204 to electronically identify partially accurate data. In one example embodiment, partially accurate data may be listed as exceptions on the electronic account certification report and, if the partially accurate date meets program rules, the data may be determined acceptable for processing.

Figure 7D:
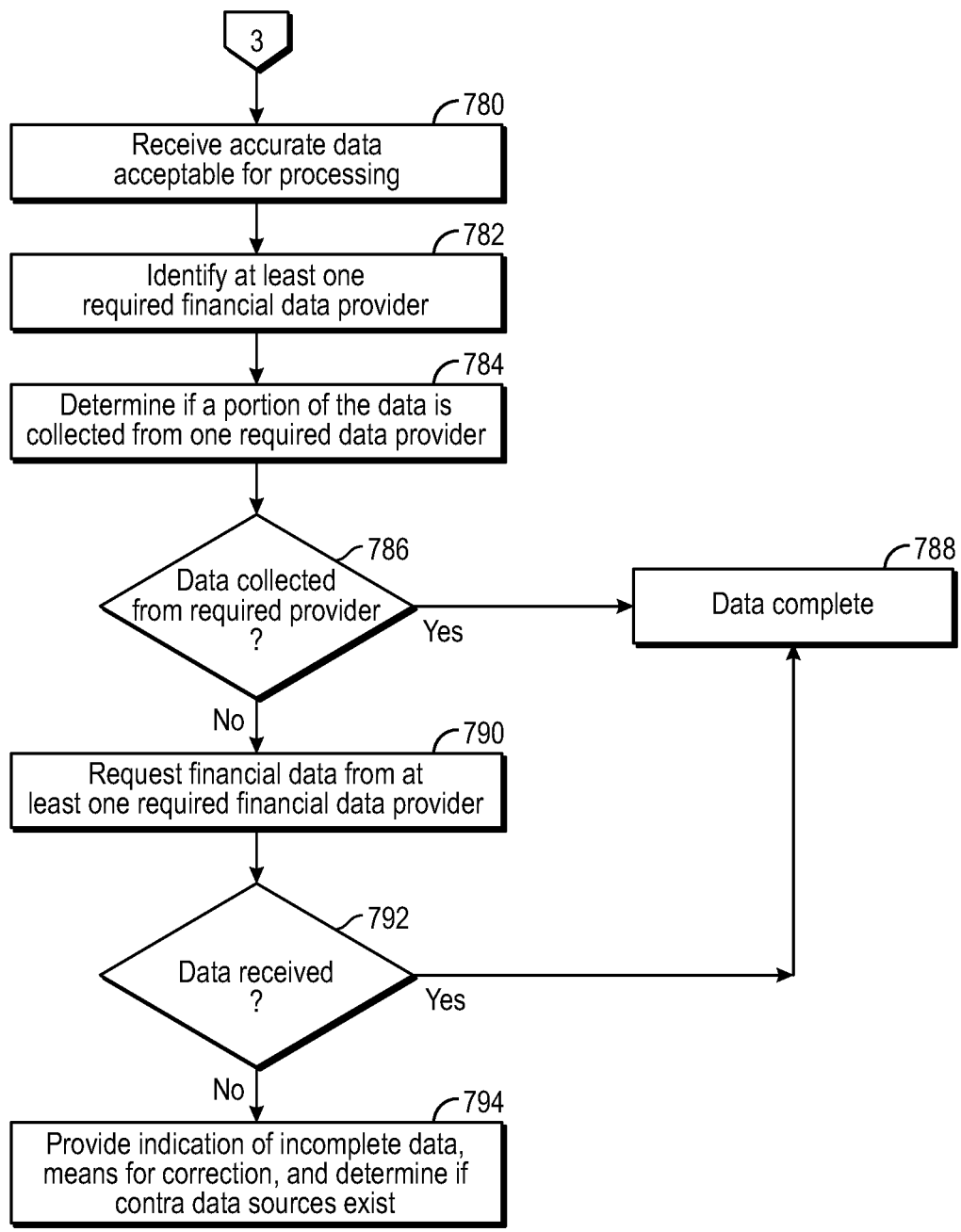

FIG. 7D illustrates one example computer-implemented method by which the certification system 204 operates to determine if financial account data obtained from the financial data source 208 is complete, according to an embodiment of the invention. In block 780, the certification system 204 may receive fully accurate or partially accurate financial data (FIG. 7C) acceptable for processing. Generally, the certification system 204 may electronically determine if financial data is accurate before determining if the financial data obtained from the financial data providers 208 is complete. However, in alternative embodiments the certification system 204 may determine if data obtained from a financed data provider 208 is complete before determining if financial data obtained is accurate.

In block 782, the certification system 204 may identify at least one required financial data provider 208 requiring electronic account certification. This may be accomplished in one or more ways, such as identifying a financial account requiring certification from a request transmitted from a customer 206 or a requesting system 202. Similarly, the certification system 204 may electronically identify a plurality of financial accounts associated with the customer 206 and transmit a request to a receiving system 202. In this example, the certification systems 202 request may include a request for authentication and authorization from a customer 206. In this case, the customer 206 may provide the certification system 204 authorization to access financial data providers 208 identified by the certification system 204 independently of the information obtained in the requesting system 202.

In block 784, the certification system 204 may electronically determine if at least a portion of the collected financial data is collected from at least one required financial data provider 208. According to another embodiment, the certification system 204 may electronically determine if a predefined desired about of financial data was obtained from the financial data providers 208 (block 786). If the required portion of financial data was obtained from the required financial data providers 208, then the certification system 204 may electronically identify the obtained financial data to be complete 288. If the required financial data was not collected from at least one required financial data provider 208, then the certification system 204 may electronically request financial data from at least one required financial data provider (block 790). In one example embodiment, the financial data provider 208 is a contra financial data provider which stores the same financial data requiring certification. In this situation, the certification system 204 may receive authorization to access the financial data providers 208 and collect financial account data associated with the financial account (block 790). Certification system 204 may electronically determine if the data was successfully obtained (block 792) and when the required data has been obtained, the certification system 204 may indicate the data to be complete (block 788).

In block 792, the certification system 204 may determine if partially required financial data is Obtained. If the data is indicated to be at least partially incomplete, then the certification system may provide customers 206 and requesting systems 204 means to correct the information and electronically determine if contra data sources exist (block 794). It will be appreciated that the certification system 204 may have a plurality of program rules to determine if data obtained from a financial data source 208 is complete. Accordingly, if block 794 determines data to be incomplete, then several different and alternative steps may be utilized by the certification system 204 to electronically identify partially complete data. In one example embodiment, partially complete data may be listed as exceptions on the electronic account certification report and, if the partially complete data meets program rules, the data may be determined acceptable for processing.

Figure 7E:
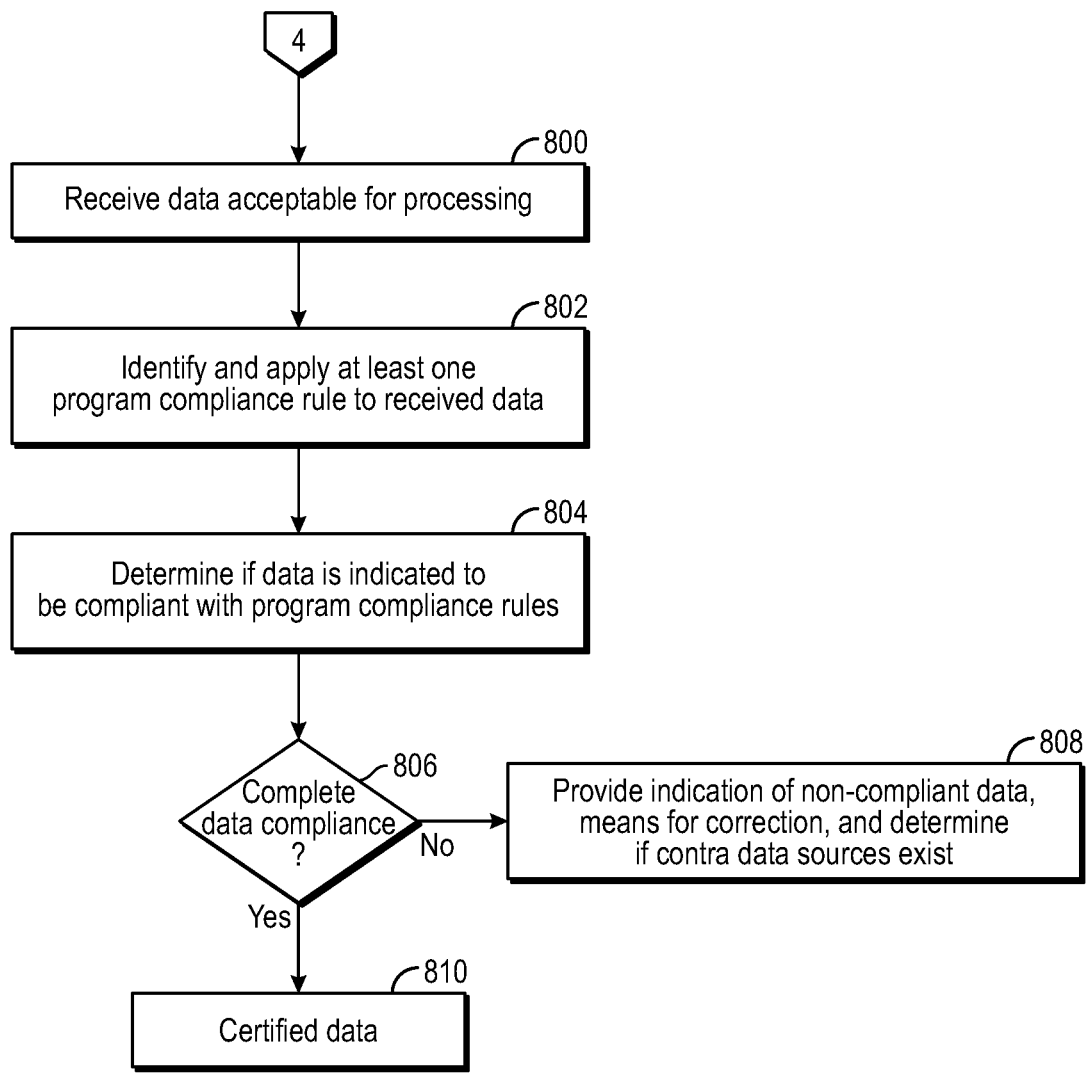

FIG. 7E illustrates one example computer-implemented method by which the certification system 204 operates to determine if accurate and complete data acceptable for processing is determined to be compliant with program rules designed to detect information relevant to system users, according to an embodiment of the invention. In block 800, the certification system 204 may process data determined acceptable for processing. Generally, the customer 206 and requesting system 202 may provide the certification system 204 program rules which are then used by the certification system 204 and continuously applied to both historical and real-time financial data (block 802). As previously discussed with respect to FIG. 5, program rules may consist of several different sets of rules established by different users. In one example embodiment, the certification system 304 applies rules to data acceptable for processing to identify check kiting, related party transactions, prohibited transactions between home buyers and home sellers, and transactions designed to overstate asset balances and understand debt account balances.

In block 806, the certification system 208 may determine if complete and accurate data acceptable for processing is further compliant with various program rules. If the data is compliant, accurate, and complete, then the certification system 204 may indicate the data to be certified data (block 810). However, if the data is indicated to be at least partially compliant then the certification system may provide customers 206 and requesting systems 204 means to correct the information and electronically determine if contra data sources exist (block 808). It will be appreciated that the certification system 204 may have a plurality of program rules to determine if data obtained from a financial data source 208 is compliant.

Accordingly, if block 806 determines data to be inaccurate, then several different and alternative steps may be utilized by the certification system 204 to electronically identify partially compliant data. In one example embodiment, partially compliant data may be listed as exceptions on the electronic account certification report and, if the partially compliant data meets program rules, the data may be determined acceptable for processing.

Total Financial Reporting ("TFR")

As used herein, the term "Total Financial Reporting" refers to electronically processing any type of financial information in real-time and generating any type of report or analysis based on real-time and/or electronically processed financial information. As used herein, the term "analysis" refers so any financial analysis system designed to detect and identify information associated with financial information, which may have access to sensitive financial data, which may be stored in financial accounts at financial institutions. Various financial account analysis examples are provided herein for purposes of explanation. However, systems and electronic methods described herein allow customized analysis and/or system defined logic which may be used to produce any type of financial analysis. A system in accordance with the invention may continuously receive sensitive financial data in real-time and logic may also be applied in real time to continuously update total financial reports in real-time.

("TFR") electronically obtains and consolidates real-time and historical electronically certified information processed by ("EAC"). It is important for ("EAC") to analyze financial data to insure completeness, accuracy and compliance before generating total financial reports. In example embodiments, the electronically generated total financial reports may be used instead of historical and incomplete credit reports. Any number of electronic financial analysis and prediction calculations may be used to generate reports, which may be used by system to match credit lenders with credit seekers, for example.

In one implementation any one or more of the following may continuously update in real-time as electronically certified real-time information is updated: Asset & Liability Scores, Income & Expense Scores, Investment Analysis, Credit Card Analysis, Credit Scores, identity Scores, Risk Scores, Consolidated Scores, Real-time financial statement preparation, Financial Ratios, Application Scorecards, Behavior Scorecards, Propensity Scorecards, Collections Scorecards, Risk analysis faced by lenders to consumers, Risk analysis faced by lenders to businesses, Risk analysis faced by business, Risk analysis faced by individuals.

Figure 8:
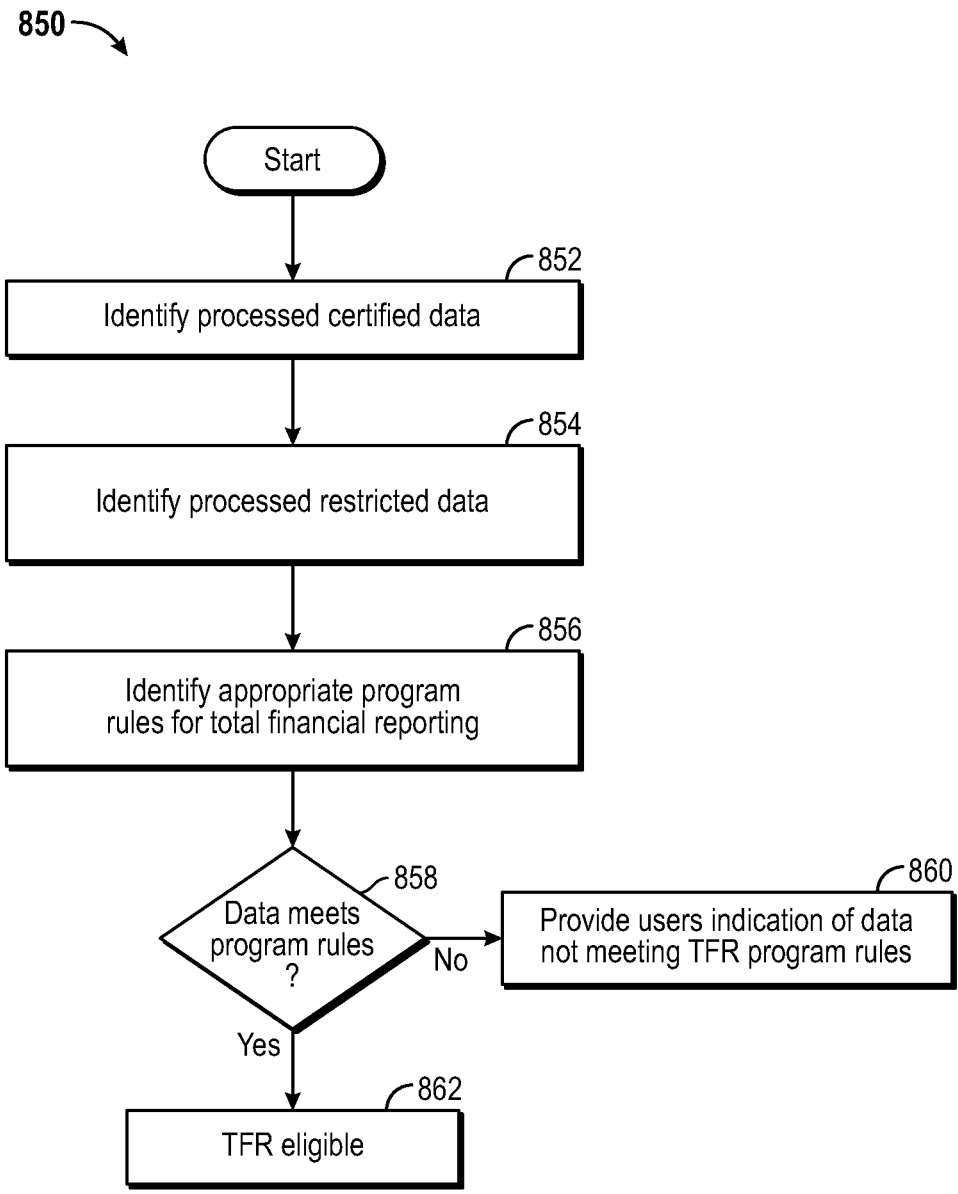
FIG. 8 is a flow diagram illustrating one example method of total financial reporting as a Function of receiving electronically certified financial data, according to an embodiment of the invention.

FIG. 8 illustrates a computer-implemented method 850 by which the certification system 204 operates to determine it processed financial data is eligible for total financial reporting (block 612, FIG. 6), according to one embodiment of the invention. In block 852, the certification system 204 may identify processed certified data stored in data storage devices 242. Generally, the certification system 204 may store data indicated to be certified (block 614, FIG. 6) in data storage devices 242 and electronically retrieve certified data for use by ("TFR"). According to an embodiment of the invention, certified data may be transmitted to receiving 202 systems and customers 206 without ("TFR") processing. Generally, the certification system 204 may receive a request for ("TFR") processing simultaneously with the request for ("EAC") processing. In this situation, the certification system 204 may provide the receiving system 202 and customer 206 ("EAC") output and ("TFR") output simultaneously, if available. In yet another embodiment, the certification system 204 may at least provide customers 206 and receiving systems 202 indication of the availability of ("TFR") data. In this situation, the certification system 204 first receives a request for electronic account certification and, after processing, determines that ("TFR") output is available, which is then transmitted to the receiving system 202 and customer 206 in the form of an indication or notice of the availability of the ("TFR") data.

In block 854, the certification system 204 may identify processed restricted data stored in data storage devices 242. Generally, the certification system 204 may store data indicated to be restricted (block 610, FIG. 6) in data storage devices 242 and electronically retrieve restricted data for use by ("TFR"). According to an embodiment of the invention, restricted data may be transmitted to receiving 202 systems and customers 206 without ("TFR") processing. In one embodiment, restricted data may not be acceptable for ("TFR"), depending on program rules, and may be identified as exceptions on an exception report transmitted to receiving systems 202.

In block 856, one or more appropriate program rules for are identified which may be applied to certified and restricted financial data to report financial information to, for example, credit bureaus, financial institutions, and the like. Data from multiple data financial data providers 208 may be considered collectively by the certification system 204 when applying one or more program rules for total financial reporting. In block 858, the certification system 204 electronically determines if data obtained meets program rules for total financial reporting. If the data meets the program rules for total financial reporting, then the certification system 204 may indicate the data as eligible for ("TFR") (block 864). On the other hand, if the data does not meet the program rules for total financial reporting, then the certification system 204 may indicate the data as ineligible for ("TFR"). Different types of rules may be applied to different types of data.

For example, data may be eligible for ("TFR") if the data complies with any of several rules. Alternatively, data may be ineligible if it fails to meet any one of several rules. In another embodiment, several groups of rules may need to be satisfied. Various other rules may be applied to the data to determine if the data is eligible for ("TFR"). Alternate rules may include any number of rules arrange in a hierarchical manner.

FIGS. 9A-9G illustrate example user interface screens 900 illustrating information related to electronic account certification and reporting. FIG. 9A is a user interface screen illustrating one example of data transmitted from a requesting system 204 and user 206 to the certification system 204. A data import interface screen 902 may display information about information imported from other systems. Import information may include user profiles 904, verification information 906 and real-estate information 908, for example. Conventional credit and loan systems do not require home sellers to verily information. However, certification systems may identify a home seller and electronically transmit system access instructions to home sellers via the World Wide Web. In some embodiments, systems of the invention electronically process identity verification, credit reports, employment verification, and income verification for home sellers. This enables a certification system to begin analyzing financial information from both a home seller and a home buyer to identify and trigger prohibited transactions.

Property information 208 may display information about any real-estate owned by user profiles 904. System electronic analyze may certify manual appraisal valuations provided by import. Furthermore, certification systems may identify information such as loan outstanding which may be useful to identify financial information.

FIG. 9B is a user interface screen illustrating account information electronically obtained related to imported user profiles. A menu section may allow users ability to navigate a system's functionality. In one example embodiment, account information menu options 910 may allow viewing user identified and system identified data sources. Example embodiments may feature ability to monitor account information from multiple groups of associated customers, such as borrowers 912, co-borrowers 914 and home sellers 916, for example. Information displayed may identify a number of user identified accounts and system identified accounts. System data sources may display indications of sources of data utilized by certification systems. Additionally, exceptions may generate identifying attempted system manipulation by providing limited account information, for example. Actions required to remedy exceptions may display with ability to send requests for additional information to system users.

FIG. 9C is a user interface illustrating certification system 204 information for a particular group of accounts related customers 206 and requesting/receiving systems 202. For example, the certification system 204 may summarize information of one or more related customers 206 or certification requests received from requesting systems 202. Status summary screens 922 may summarize information such as financial data provider 208 completeness exceptions. For example, the certification system 204 may provide indications of accounts identified, accounts requested, requests received, and outstanding requests. Capabilities to send new certification requests to users may also display. Real-time asset 624 and real-time debt information 926 may continuously update and display. Information such as cumulative balances and last update exceptions may display. Additionally, information such as total number of transactions for a particular account and the number of exceptions may display. Certification systems may display detailed debt information 926, which may provide indication the last credit report update and last ("EAC") system update. Additionally, information identifying the most current reporting data source may display 926.

FIG. 9D is an example user interface screen displaying exception details for a collection of related system users. Data accuracy exceptions 932 may display information related to exceptions associated with particular accounts. For example, exceptions may be generated if customers 206 or requesting systems 204 provide financial account access for accounts which do not belong to the customers 206. Exception types may display illustrating a degree of priority of a particular exception. For example, "High" exceptions may require action before a particular process may initiate. Compliance exceptions 936 may provide information related to specific transactions which may have exceptions, such as prohibited and/or related party transactions. Various details associated with a compliance exception may display, such as payee/payer, date, amount, etc. Custom exceptions 936 may also display information relevant to customized role sequences, such as possible check kiting detection, etc.

FIG. 9E is a user interface screen illustrating one example of a consolidated electronic account certification report. Asset account information 942 may display current balances, last update, and notify users that asset information is not found on credit report, for example. Debt account information 944 may display real-time balances and last update time. Additionally, certification systems 204 may identify a credit report balance and the date in which a credit report balance was last updated. System default mechanisms may enable utilization of ("EAC") system debt balance data instead of historical and non-current credit report balance data. Summaries of exceptions 946 may be consolidated with balance information and various types of additional information, such as prohibited and related party transactions, for example.

FIG. 9F is a user interface screen illustrating one example of real-time total financial reporting information. Information may include any type of financial analysis 952, such as balance sheet, income statement, cash flow, financial ratios, for example. Financial scorecards 954 may be processed and may include scorecard information which factors real-time asset and income information not currently offered by credit scorecards. Risk analysis reports 956 may be available, which may display information such a what-if-scenarios, identity scorecards and behavior scorecards, for example.

FIG. 9G is a user interface illustrating example certification system 204 setting functionality that may display to system administrators and users. Dispute processing and monitoring 962 may display information and access links to disputed information. Certification setting 964 options may provide users means to customize certification logic, such as viewing government rules, user rules, custom rules, and other information relevant information for managing and monitoring account certification functionality. Additionally, total financial reporting settings 966 options may provide users means to customize total financial reporting logic, such as scorecard logic, scoring logic and any other type of financial analysis relevant to total financial reporting functionality.

As described above, certification system 204 data may have many practical uses in the credit lending and reporting environment. For example, certification systems 204 may be used to electronic match credit interest of customers 206. Customer 206 may further comprise credit lenders and credit seekers and customers 206 may define "preferable terms" of credit electronically by defining "interests" which may be stored by the certification system 204. Additionally, certification systems 204 may be used by credit bureaus and offered as "premium" services which customers may "enroll" into via a credit bureaus web site, for example. In yet another example, customers 206 rosy provide authorization to access financial data sources 208 voluntarily by swiping cards, syncing mobile devices, or inputting information into key pads or web sites at merchant locations, which transmit requests to certification systems 204 to authorize or decline credit applications, for example.

Figure 10A:
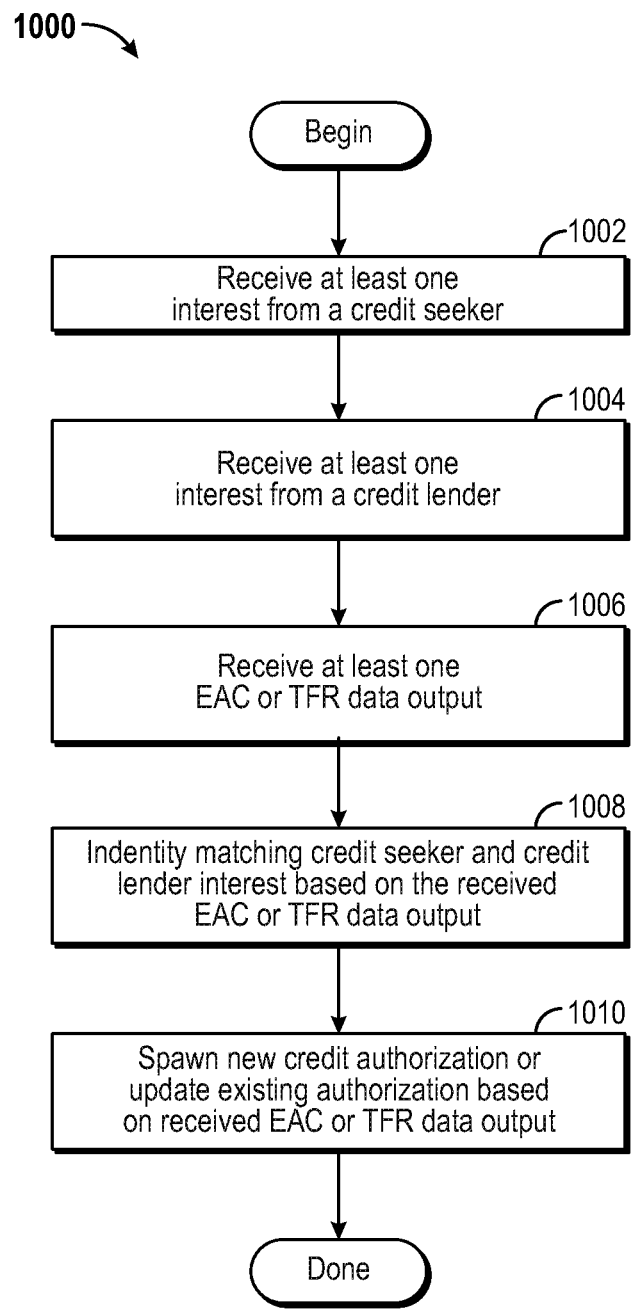
FIGS. 10A-10B are flow diagrams illustrating examples of the certification system used in credit reporting and authorization environments.
Figure 10B:
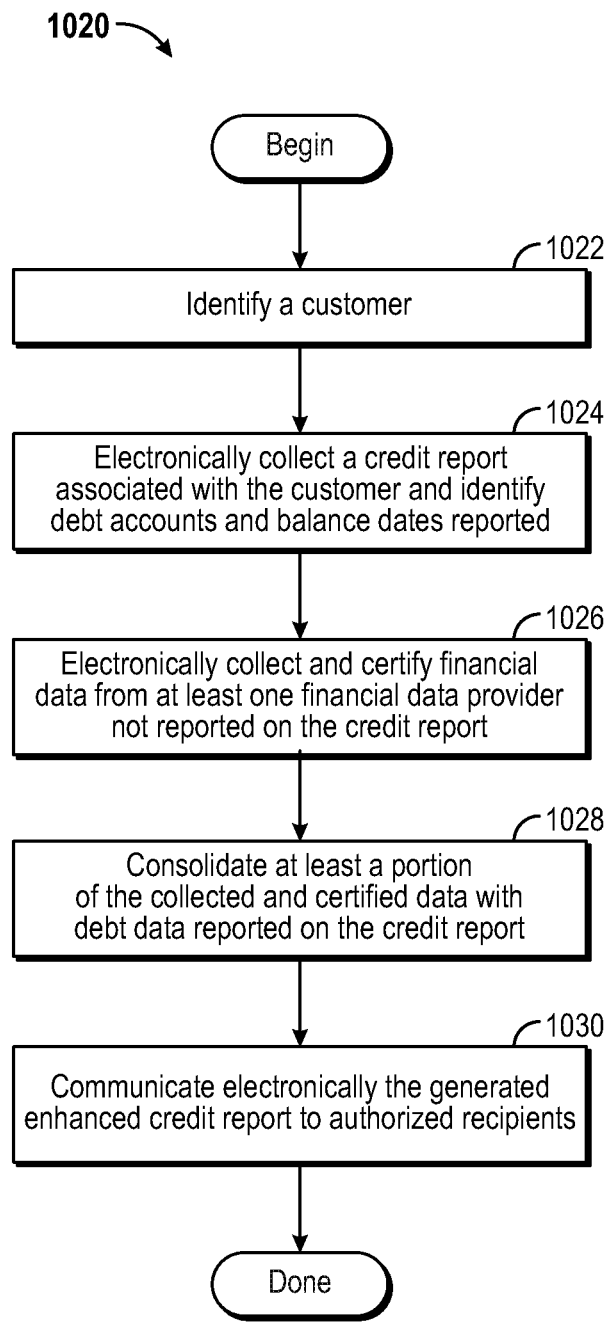

FIGS. 10A-10B are flow diagrams illustrating the certification system used in real-world credit lending, credit reporting, credit authorization environments. FIG. 10A describes a computer-implemented method in which the certification system 204 is used to electronically match credit interest of credit seekers with credit interest of credit lenders. The certification system 204 provides credit lenders real-time transparency into the credit seekers financial picture and may be used to improve credit leading risk management and liquidity. A method may start at block 1002 wheat the certification system 204 receives at least one interest from a credit seeker, which may be stored in the processors 226. The certification system 204 may also receive at least one interest from a credit lender, which may also be stored in the processor 226. Interests received from the credit lenders and credit seeker may define "preferable terms" of credit. For example, a credit seeker may defined what credit terms they are searching for and a credit lender may define what credit terms they wish to grant, as a function of the electronically certified financial data output from the certification system.

At block 1006 the certification system outputs at least one electronic account certification or total financial report. The electronic account certification and total financial reporting information may be used to electronically identify matching credit seeker and credit lender interested based on the information contained in the report. For example, the certification system 204 may output consolidated and electronically certified enhanced credit reports that contain real-time asset data consolidated with the historical and incomplete debt account data. In this situation, the certification system 204 may also electronically use the historical credit data to electronically obtain real-time credit data. At block 1010, the certification system 204 may identify matching interests and in response to this identification, electronically spawn a new credit, authorization or electronically update an existing credit authorization.

FIG. 10B describes a computer-implemented method of enhanced credit reporting in which the certification system 204 is used by a credit bureau to electronically consolidate certified asset data with historical and incomplete credit reports. At block 1022, a customer may be identified in one or more ways, such as via data transfer from a credit reporting agency. The certification system 204 may collect a credit report associated with the customer and simultaneously identify debt accounts and balance dates reported on the credit report (block 1024). The information transmitted from the requesting system 202 (in this case a credit Reporting agency) may provide information used by the certification system 204 in electronically collect and certify financial data from at least one financial data provider not reported on the credit file (block 1026). For example, the certification system 204 may be integrated into a credit reporting agencies web site (e.g., Equifax.com™) and customers 206 may access the certification system 204 as an enhanced service located on the credit reporting agencies web site. The certification system 204 may enable the customer 206 to provide financial account access authorization to the certification system 204 in one or more way, directly from the credit reporting agencies site.

At block 1028, the certification system 204 may electronically consolidate at least a portion of the collected and certified data with debt data reported on the credit report. The enhanced credit report file may then be communicated electronically to authorized recipients (block 1030). For example, this consolidated enhanced credit report may be stored in a database management system 242 and readily available to one or more requesting systems 202, such as a merchant credit authorization service or any company that need to access a credit report.

Unless the context clearly requires otherwise, throughout the description and the claims, the words "comprised" "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder" "above," "below," and word of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the computer-implemented methods and systems are not intended to be exhaustive or to limit the embodiments to the precise form or instructions disclosed. While specific embodiments of, and examples for, the system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the certification system in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

What is claimed is:

1. A computer-implemented method for providing certified financial data from a certifying entity indicating lending risk about an individual, comprising:
   (a) receiving, at a computer, a request for the certified financial data from a user over a computer network, wherein the request is received by the certifying entity that executes instructions independently from the user on a remote server;
   (b) electronically collecting financial account data connected with the individual from at least one financial source over the computer network and the Internet, wherein (i) the data is collected through the computer network and is asset data, debt data, income data, expense data, credit report data, employment data, or identity data and (ii) the data is collected by the certifying entity;
   (c) transforming the financial account data into a desired format;
   (d) validating the financial account data by applying an algorithm to the financial account data to identify exceptions, wherein the exceptions indicate incorrect data or lending risk, wherein (i) the algorithm validates the data using a pattern of risk and is a plurality of financial rules: (ii) and the pattern of risk is selected from the group consisting of not-sufficient funds instances, direct deposits, deposit transactions, transaction velocity, purchase history, and combinations thereof, and (iii) the certifying entity defines the algorithm to assess an ability of repaying a loan;
   (e) confirming the exceptions by electronically collecting additional data and iteratively applying the algorithm to the additional data, wherein the additional data is financial data specific to the individual, wherein the algorithm applies additional rules to the additional data to confirm the exception, wherein the additional data is automatically selected from the most reliable source;
   (f) marking the exceptions, after step as valid exceptions when output of the algorithm validates the exceptions; and
   (g) electronically and graphically reporting the financial account data, the valid exceptions, and the lending risk to the user in real time.

2. The method as claimed in claim 1, wherein the steps (b) through step (f) are continually updated in real time.

3. The method as claimed in claim 1, wherein the at least one financial source is selected from a group consisting of employers, financial institutions, mortgage lenders, credit card bureaus, credit reporting bureaus, financial aggregators, securities firms, and investment firms.

4. The method as claimed in claim 1, further comprising: determining whether the certified financial data is suitable for reporting by comparing the certified financial data to criteria provided by a requester; and transmitting the certified financial data to an authorized recipient.

5. The method as claimed in claim 1, wherein the confirmation step comprises the steps of: querying the specific individual for permission to access one of the at least one financial source for additional financial data related to the exceptions; requesting authorization to access the additional financial data, wherein the authorization request includes authentication information associated with the individual; receiving authorization to access the additional financial data; collecting the financial data subsequent to receiving authorization to access the financial data; and applying algorithm engine to the additional financial data.

6. The method as claimed in claim 1, further comprising electronically collecting financial data from one or more financial data providers via one or more computer readable media.

7. The method as claimed in claim 1, wherein the financial account data comprises at least one of asset data, debt data, income data, expense data, credit report data, employment data, or identity data.

8. A computer-implemented method for providing a certified financial report indicating financial risk about an individual, comprising:
   (a) electronically receiving a request for the certified financial report;
   (b) electronically collecting direct source financial account data about the individual from at least one financial source,
   (c) transforming the financial account data into a standard format;
   (d) selecting one or more operations to apply to financial account data;

(e) validating the execution of the operations by applying test data to the operations and comparing the resulting output to the known-good output of the operation;
(f) validating the financial account data by executing the validated operations to the financial account data to identify exceptions, wherein the exceptions indicate incorrect data or financial risk;
(g) confirming iteratively the exceptions by collecting additional data and applying the operations to the additional data, wherein the operations include financial rules and additional rules are applied to the additional data, wherein the additional data is automatically selected from the most reliable source;
(h) marking the exceptions as valid exceptions when output of the operations validates the exceptions; and
(i) generating, using a computer, the certified financial report from the financial account data and the valid exceptions, wherein the financial account data comprises at least one of direct source transaction data, direct source balance data, direct source historical transaction data, or direct source historical balance data; and the operations results identify a pattern of financial risk; the method is computer implemented, and all steps are executed via the computer or a series of computers.

9. A computer-implemented method for providing reporting certified financial data indicating data accuracy and financial risk about an individual, comprising:
(a) receiving a request for a report on the certified financial data;
(b) electronically collecting financial account data about the individual from at least one financial source, wherein the financial account data comprises at least one of real-time transaction data, real time balance data, historical transaction data, or historical balance data;
(c) transforming the collected financial account data into a desired electronic account certification format;
(d) validating the financial account data by applying an algorithm engine to the financial account data to identify a first set of exceptions, wherein the first set of exceptions indicates incorrect inaccurate data or financial risk and the algorithm engine includes a plurality of financial rules specific to lending risk;
(e) confirming by iteration the first set of exceptions by electronically collecting additional financial account data and applying the algorithm engine, transforming the additional financial account data into electronic account certification format, and validating the additional financial account data by identifying a second set of exceptions to the additional financial account data, and comparing the second set of exceptions to the first set of exceptions to determine valid exceptions, wherein additional rules are applied to confirm the additional data, wherein the additional data is automatically selected from the most reliable source;
(f) marking the exceptions as valid exceptions for inclusion in the report when output of the algorithm engine validates the exceptions; and
(g) generating, using a computer, the report from the financial account data on the certified financial data and the valid exceptions, and providing the report to a requestor, wherein the financial account data comprises at least one of real-time transaction data, real time balance data, historical transaction data, or historical balance data; and the algorithm engine identifies a pattern of financial risk; the method is computer implemented, and steps (c), (e), and (f) are executed via the computer or a series of computers.

\* \* \* \* \*